US012408637B2

(12) United States Patent
Mizrahi et al.

(10) Patent No.: US 12,408,637 B2
(45) Date of Patent: Sep. 9, 2025

(54) COMPOSITIONS FOR INOCULATING AQUATIC ANIMALS

(71) Applicants: The National Institute for Biotechnology in the Negev Ltd., Beer-Sheva (IL); The State of Israel, Ministry of Agriculture & Rural Development, Agricultural Research Organization, (ARO) (Voicani Institute), Rishon-LeZion (IL)

(72) Inventors: Itzhak Mizrahi, LeHavim (IL); Avner Cnaani, Beit Hashmonai (IL); Foteini Kokou, Crete (GR); Sheenan Menachem Harpaz, Rehovot (IL)

(73) Assignees: The National Institute for Biotechnology in the Negev Ltd., Beer-Sheva (IL); The State of Israel, Ministry of Agriculture & Food Security, Agricultural Research Organization, Rishon-LeZion (IL)

( * ) Notice: Subject to any disclaimer, the term of this patent is extended or adjusted under 35 U.S.C. 154(b) by 682 days.

(21) Appl. No.: 17/676,939

(22) Filed: Feb. 22, 2022

(65) Prior Publication Data
US 2022/0174914 A1    Jun. 9, 2022

Related U.S. Application Data

(63) Continuation of application No. PCT/IL2020/050912, filed on Aug. 20, 2020.

(60) Provisional application No. 62/890,122, filed on Aug. 22, 2019.

(51) Int. Cl.
A01K 61/13    (2017.01)

(52) U.S. Cl.
CPC .................. *A01K 61/13* (2017.01)

(58) Field of Classification Search
None
See application file for complete search history.

(56) References Cited

U.S. PATENT DOCUMENTS

2014/0065186 A1* 3/2014 Tokura .............. A61K 39/107
                                                424/234.1

FOREIGN PATENT DOCUMENTS

| CN | 101921710 | 12/2010 | | |
| CN | 105349463 | 2/2016 | | |
| ES | 2321791 | 6/2009 | | |
| WO | WO-2004043140 A2 * | 5/2004 | ............. | A23K 10/18 |
| WO | WO-2012101528 A2 * | 8/2012 | ............. | A01N 63/04 |
| WO | WO-2019135009 A1 * | 7/2019 | ............. | A23K 10/18 |

OTHER PUBLICATIONS

International Search Report and the Written Opinion Dated Nov. 5, 2020 From the International Searching Authority Re. Application No. PCT/IL2020/050912. (15 Pages).
Irianto et al. "Use of Probiotics to Control Furunculosis in Rainbow Trout, Oncorhynchus mykiss (Walbaum)", Journal of Fish Diseases, 25(6):333-342, Jun. 25, 2002.
Makridis et al. "Evaluation of Candidate Probiotic Strains for Gilthead Sea Bream Larvae (Sparus Aurata) Using an In Vivo Approach", Letters in Applied Microbiology, 40(4): 274-277, Feb. 28, 2005.
Reina et al. "Stenotrophomonas Maltophilia AHL-Degrading Strains Isolated from Marine Invertebrate Microbiota Attenuate the Virulence of Pectobacterium carotovorum and Vibrio CoralliilyTicus", Marine Biotechnology, 21: 276-290,Feb. 14, 2019.
Robinson et al. "Experimental Bacterial Adaptation to the Zebrafish Gut Reveals a Primary Role for Immigration", PLOS Biology, 16(12): e2006893: 1-26, Dec. 10, 2018.
Talwar et al. "Fish Gut Microbiome: Current Approaches and Future Perspectives", Future Perspectives. Indian Journal of Microbiology 58: 397-414, Aug. 27, 2018.
Verma et al. "Probiotics Application in Aquaculture: Improving Nutrition and Heath", Journal of Animal Feed Science and Technology, .3: 53-64, 2015.
Notification of Office Action and Search Report Dated Jan. 20, 2023 From the State Intellectual Property Office of the People's Republic of China Re. Application No. 202080073911.0 and Its Summary Into English. (11 Pages).
English Summary and Machine Translation Dated Oct. 31, 2023 Notification of Office Action Dated Oct. 18, 2023 From the State Intellectual Property Office of the People's Republic of China Re. Application No. 202080073911.0. (11 Pages).
Notification of Office Action Dated Oct. 18, 2023 From the State Intellectual Property Office of the People's Republic of China Re. Application No. 202080073911.0. (6 Pages).
Supplementary European Search Report and the European Search Opinion Dated Oct. 4, 2023 From the European Patent Office Re. Application No. 20855532.6. (11 Pages).
Chauhan et al. "Probiotics in Aquaculture: A Promising emerging Alternative Approach", Symbiosis, 77(2): 99-113, Nov. 10, 2018.
Ramirez et al. "Partial Evaluation of Autochtonous Probiotic Potential of the Gut Microbiota of Seriola Lalandi", Probiotics and Antimicrobial Proteins, 12(2): 672-682, May 10, 2019.
Sukanta "Role of Gastrointestinal Microbiota in Fish", Aquaculture Research, 41(11): 1553-1573, Jun. 16, 2010.

* cited by examiner

*Primary Examiner* — Oluwatosin A Ogunbiyi

(57) ABSTRACT

A method of culturing an aquaculture of an aquatic animal species of interest is disclosed. The method comprises inoculating the aquaculture with bacteria of at least one genera selected from the group consisting of *Pseudomonas, Limnohabitans, Janthinobacterium, Stenotrophomonas, Aeromonas, Acinetobacter* and *Morganella*, wherein the bacteria are provided in an amount sufficient to increase the survival and/or weight of the aquatic animal, thereby culturing the aquaculture of the aquatic animal species.

18 Claims, 15 Drawing Sheets
(15 of 15 Drawing Sheet(s) Filed in Color)
Specification includes a Sequence Listing.

P-value < 0.01

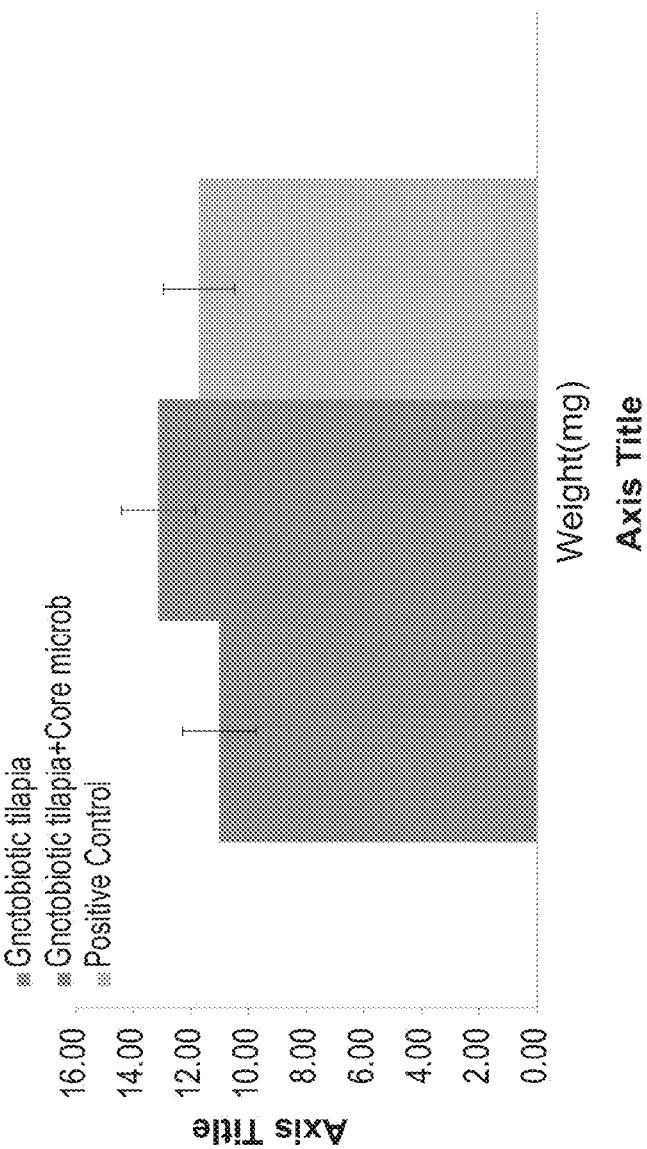
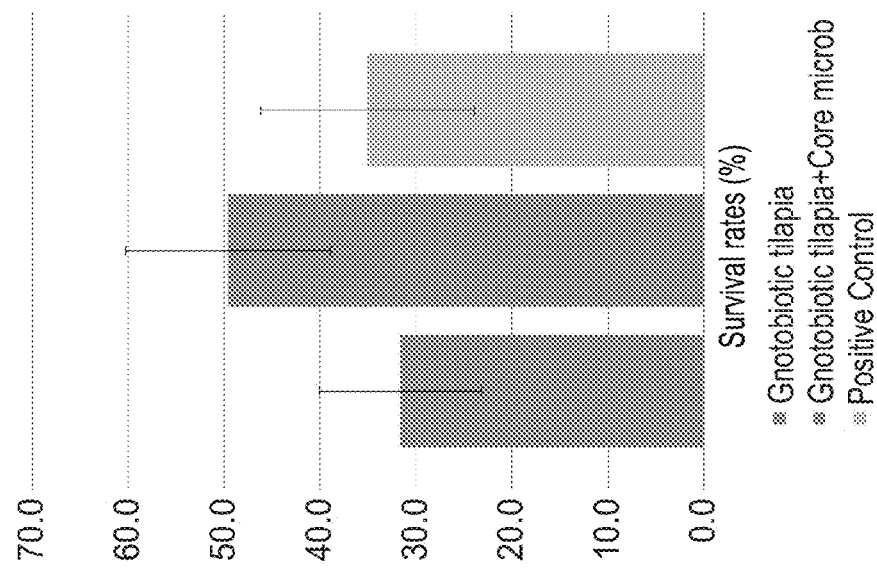

US 12,408,637 B2

```
                       SEQUENCE LISTING

<160> NUMBER OF SEQ ID NOS: 8

<210> SEQ ID NO 1
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 1
ccgcgtgagt gaagaaggcc ttcgggttgt aaagctcttt tgtcagggaa gaaacggtga      60
gagctaatat ctcttgctaa tgacggtacc tgaagaataa gcaccggcta actacgtgcc     120
agcagccgcg gtaatacgta gggtgcaagc gttaatcgga attactgggc gtaaagcgtg     180
cgcaggcggt tttgtaagtc tgatgtgaaa tccccgggct caacctggga attgcattgg     240
agactgcaag gctagaatct ggcagagggg ggtagaattc cacgtgtagc agtgaaatgc     300
gtagatatgt ggaggaacac cgatggcgaa ggcagccccc tgggtcaaga ttgacgctca     360
tgcacgaaag cgtggggagc aaacaggatt agataccctg gtagtcc                   407

<210> SEQ ID NO 2
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 2
ccgcgtgtgt gaagaaggcc ttcgggttgt aaagcacttt cagcgaggag gaaaggttgg      60
tagctaataa ctgccagctg tgacgttact cgcagaagaa gcaccggcta actccgtgcc     120
agcagccgcg gtaatacgga gggtgcaagc gttaatcgga attactgggc gtaaagcgca     180
cgcaggcggt tggataagtt agatgtgaaa gccccgggct caacctggga attgcattta     240
aaactgtcca gctagagtct tgtagagggg ggtagaattc caggtgtagc ggtgaaatgc     300
gtagagatct ggaggaatac cggtggcgaa ggcggccccc tggacaaaga ctgacgctca     360
ggtgcgaaag cgtggggagc aaacaggatt agataccctg gtagtca                   407

<210> SEQ ID NO 3
<211> LENGTH: 403
<212> TYPE: DNA
<213> ORGANISM: Artificial sequence
<220> FEATURE:
<223> OTHER INFORMATION: Exemplary 16S rRNA sequence

<400> SEQUENCE: 3
```

```
ccgcgtgggt gaagaaggcc ttcgggttgt aaagccctTt tgttgggaaa gaaaagcagt    60
cgattaatac tcggttgttc tgacggtacc caaagaataa gcaccggcta acttcgtgcc   120
agcagccgcg gtaatacgaa gggtgcaagc gttactcgga attactgggc gtaaagcgtg   180
cgtaggtggt tgtttaagtc tgttgtgaaa gccctgggct caacctggga attgcagtgg   240
atactgggcg actagagtgt ggtagagggt agtggaattc ccggtgtagc agtgaaatgc   300
gtagagatcg ggaggaacat ccatggcgaa ggcagctacc tggaccaaca ctgacactga   360
ggcacgaaag cgtggggagc aaacaggatt agatacctg gta                      403
```

<210> SEQ ID NO 4
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 4

```
ccgcgtgtgt gaagaaggtc ttcggattgt aaagcacttt aagttgggag gaagggttgt    60
agattaatac tctgcaattt tgacgttacc gacagaataa gcaccggcta actctgtgcc   120
agcagccgcg gtaatacaga gggtgcaagc gttaatcgga attactgggc gtaaagcgcg   180
cgtaggtggt tgttaagtt ggatgtgaaa tccccgggct caacctggga actgcattca    240
aaactgactg actagagtat ggtagagggt ggtggaattt cctgtgtagc ggtgaaatgc   300
gtagatatag gaaggaacac cagtggcgaa ggcgaccacc tggactaata ctgacactga   360
ggtgcgaaag cgtggggagc aaacaggatt agatacctg gtagtca                  407
```

<210> SEQ ID NO 5
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 5

```
ccgcgtgtgt gaagaaggtc ttcggattgt aaagcacttt aagttgggag gaagggcagt    60
aaattaatac tttgctgttt tgacgttacc gacagaataa gcaccggcta actctgtgcc   120
agcagccgcg gtaatacaga gggtgcaagc gttaatcgga attactgggc gtaaagcgcg   180
cgtaggtggt tgttaagtt gaatgtgaaa tccccgggct caacctggga actgcatcca    240
aaactggcaa gctagagtat ggtagagggt agtggaattt cctgtgtagc ggtgaaatgc   300
gtagatatag gaaggaacac cagtggcgaa ggcgactacc tggactgata ctgacactga   360
ggtgcgaaag cgtggggagc aaacaggatt agatacctg gtagtca                  407
```

<210> SEQ ID NO 6
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 6

```
ccgcgtgtat gaagaaggcc ttcgggttgt aaagtacttt cagtcgggag gaaggtgtca    60
aggttaataa ccttggcaat tgacgttacc gacagaagaa gcaccggcta actccgtgcc   120
agcagccgcg gtaatacgga gggtgcaagc gttaatcgga attactgggc gtaaagcgca   180
```

```
cgcaggcggt tgattgagtc agatgtgaaa tccccgggct taacccggga attgcatctg    240
atactggtca gctagagtct tgtagagggg ggtagaattc catgtgtagc ggtgaaatgc    300
gtagagatgt ggaggaatac cggtggcgaa ggcggcccc tggacaaaga ctgacgctca    360
ggtgcgaaag cgtggggagc aaacaggatt agataccctg gtagtcc                  407

<210> SEQ ID NO 7
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 7
ccgcgtgcag gatgaaggcc ctcgggttgt aaactgcttt tgtacggaac gaaaaggttt    60
ctattaatac taggagctca tgacggtacc gtaagaataa gcaccggcta actacgtgcc    120
agcagccgcg gtaatacgta gggtgcaagc gttaatcgga attactgggc gtaaagcgtg    180
cgcaggcggt tatgtaagac agaggtgaaa tccccgggct caacctggga actgcctttg    240
tgactgcata gctagagtac ggtagagggg gatggaattc cgcgtgtagc agtgaaatgc    300
gtagatatgc ggaggaacac cgatggcgaa ggcaatcccc tggacctgta ctgacgctca    360
tgcacgaaag cgtggggagc aaacaggatt agataccctg gtagtcc                  407

<210> SEQ ID NO 8
<211> LENGTH: 407
<212> TYPE: DNA
<213> ORGANISM: Artificial sequence
<220> FEATURE:
<223> OTHER INFORMATION: Exemplary 16S rRNA sequence

<400> SEQUENCE: 8
ccgcgtgtgt gaagaaggcc ttttggttgt aaagcacttt aagcgaggag gaggctcctt    60
tagttaatac ctaaagtgag tgacgttact cgcagaataa gcaccggcta actctgtgcc    120
agcagccgcg gtaatacaga gggtgcgagc gttaatcgga tttactgggc gtaaagcgtg    180
cgtaggcggc tttttaagtc ggatgtgaaa tccctgagct taacttagga attgcattcg    240
atactggaaa gctagagtat gggagaggat ggtagaattc caggtgtagc ggtgaaatgc    300
gtagagatct ggaggaatac cgatggcgaa ggcagccatc tggcctaata ctgacgctga    360
ggtacgaaag catggggagc aaacaggatt agataccctg gtagtca                  407
```

COMPOSITIONS FOR INOCULATING AQUATIC ANIMALS

RELATED APPLICATIONS

This application is a Continuation of PCT Patent Application No. PCT/IL2020/050912 having international filing date of Aug. 20, 2020, which claims the benefit of priority under 35 USC § 119(e) of U.S. Provisional Patent Application No. 62/890,122 filed on Aug. 22, 2019. The contents of the above applications are all incorporated by reference as if fully set forth herein in their entirety.

SEQUENCE LISTING STATEMENT

The ASCII file, entitled 91396SequenceListing.txt, created on Feb. 22, 2022, comprising 5,865 bytes, submitted concurrently with the filing of this application is incorporated herein by reference.

FIELD AND BACKGROUND OF THE INVENTION

The present invention, in some embodiments thereof, relates to methods and compositions for farming animals and, more particularly, but not exclusively, to the use of probiotics for culturing fish.

Aquaculture is a diverse and rapidly expanding industry. Responsible expansion of aquafeeds, inter alia, requires finding alternatives to fishmeal and fish oil for which aquaculture is the largest user. Fishmeal is used in aquafeeds because it meets the essential amino acid needs of most farmed fish. Fish oil is a prized aquafeed ingredient because it is a rich source of n3 polyunsaturated fatty acids (n3 PUFAs), especially two PUFAs that provide the best health benefit for human consumption: eicosapentaenoic acid (EPA, C20:5n3) and docosahexaenoic acid (DHA, C22:6n3). Aquaculture feeds currently use over 80% of the world's fishmeal and fish oil, which are extracted from small ocean-caught fish. This has four unsustainable consequences. First, analysts project exhaustion of global supplies of fishmeal and oil by 2040 (Duarte, et al. (2009) Bioscience 59(11):967-976), with huge price increases already indicating scarcity. Feed production is also aquaculture's main cause of fossil fuel consumption and greenhouse gas emissions due to harvesting and converting ocean fish into fishmeal and fish oil, and transporting these global commodities (Pelletier & Tyedmers (2010) J. Industr. Ecol. 14:467-481). Further, overfishing of small ocean fish for fishmeal and oil is causing large declines in marine biodiversity because these same small fish are the main prey, i.e., the forage fish for predatory fish (e.g., tuna), marine mammals, and sea birds (Smith, et al. (2011) Science 33:1147-1150; Troell, et al. (2014) Proc. Natl. Acad. Sci. USA 111:13257-63). Moreover, diversion of these forage fish to fishmeal and fish oil production erodes human food security because it takes an average of 5 kg of edible fish to produce the fish meal and fish oil in diets fed to yield 1 kg of farmed fish, causing a global net loss in edible fish (Naylor, et al. (2009) Proc. Natl. Acad. Sci. USA 106:15103-15110). Forage fish provide over 50 percent of the total food fish supply for people in more than 36 countries but their diversion into nonfood commodities has raised their prices to levels unaffordable for many impoverished peoples (Tacon & Metian (2009) Ambio 38:294-302; Troell, et al. (2014) Proc. Natl. Acad. Sci. USA 111:13257-63). It has thus been recommended that government limits be placed on the use of food-grade forage fish for animal feeds and finding alternative feed sources.

Partial substitution of fishmeal and fish oil with terrestrial plant ingredients is useful but insufficient for responsible and nutritionally complete diet formulations. Overreliance on terrestrial crops embroils aquaculture in concerns about massive diversion of crops from human consumption to animal feeds, just when agriculture faces a global challenge to feed nearly a billion chronically hungry people (Foley, et al. (2011) Nature 478:337-342; Troell, et al. (2014) Proc. Natl. Acad. Sci. USA 111:13257-63). Dependence on terrestrial crops also risks turning the rapidly expanding aquaculture sector into a driver of environmentally unsustainable agricultural practices for the world's grains and oils (Foley, et al. (2011) Nature 478:337-342). Moreover, unbalanced levels of essential amino acids, low levels of n3 PUFAs, lack of DHA and EPA, a low ratio of n3:n6 fatty acids, and high levels of anti-nutritional factors (Sarker, et al. (2013) Rev. Aquacult. 5:1-21) have limited inclusion rates of terrestrial plant ingredients, even in diets for omnivorous species like tilapia (Shiau, et al. (1990) Aquaculture 86:401-407; Maina, et al. (2002) Aquacult. Res. 33:853-862; Borgeson, et al. (2006) Aquacult. Nutr. 12:141-149; Ng & Low (2005) J. Applied Aquacult. 17:87-97; Azaza, et al. (2009) Aquacult. Nutr. 17:507-521; Thompson, et al. (2012) N. Am. J. Aquacult. 74:365-375).

SUMMARY OF THE INVENTION

According to an aspect of the present invention, there is provided a method of culturing an aquaculture of an aquatic animal species of interest, the method comprising inoculating the aquaculture with bacteria of at least one genera selected from the group consisting of *Pseudomonas, Limnohabitans, Janthinobacterium, Stenotrophomonas, Aeromonas, Acinetobacter* and *Morganella*, wherein the bacteria are provided in an amount sufficient to increase the survival and/or weight of the aquatic animal, thereby culturing the aquaculture of the aquatic animal species.

According to another aspect of the present invention, there is provided a aquaculture inoculant for inoculating an aquatic animal species of interest, the inoculant comprising bacteria of at least one bacterial genera selected from the group consisting of *Pseudomonas, Limnohabitans, Janthinobacterium, Stenotrophomonas, Aeromonas, Acinetobacter* and *Morganella*, the inoculant comprising no more than 20 different bacterial genera.

According to embodiments of the present invention, the bacteria are of a species selected from the group consisting of *Pseudomonas veronii, Pseudomonas fragi, Limnohabitans planktonicus, Janthinobacterium lividum, Stenotrophomonas maltophilia* and *Aeromonas hydrophila*.

According to embodiments of the present invention, the bacteria are of the bacterial species *Pseudomonas veronii, Pseudomonas fragi, Limnohabitans planktonicus, Janthinobacterium lividum, Stenotrophomonas maltophilia* and *Aeromonas hydrophila*.

According to embodiments of the present invention, the bacteria are of no more than 20 different bacterial species.

According to embodiments of the present invention, the bacteria are comprised in a feed or a filter.

According to embodiments of the present invention, the aquatic animal species of interest comprises fish.

According to embodiments of the present invention, the aquatic animal species of interest comprises a plurality of individuals of fish species of interest at a predetermined developmental stage.

According to embodiments of the present invention, the feed further comprises a nutritional ingredient which comprises fat, carbohydrate, vitamins and/or minerals.

According to embodiments of the present invention, the ingredient is selected from the group consisting of fishmeal, fish oil, poultry meal, poultry by-product meal, feather meal, meat meal, blood meal, bone meal, rapeseed, corn gluten, linseed, poultry oil, wheat and soy and their derivatives, lupin meal, pea protein, sunflower meal, faba bean meal, canola oil, algae, micro algae, seaweed, periphyton and agricultural or animal industry by-products.

According to embodiments of the present invention, the bacteria are formulated in a composition comprising an additive selected from the group consisting of attractants, anti-oxidants, immunostimulants, enzymes, pigments, organic acids, prebiotics, feeding stimulants, hormones and binders.

According to embodiments of the present invention, the bacteria are formulated in a composition which is devoid of an antimicrobial agent.

According to embodiments of the present invention, the bacteria are viable.

According to embodiments of the present invention, the bacteria are of no more than 20 different bacterial genera.

According to embodiments of the present invention, the bacteria are of no more than 10 different bacterial species.

According to embodiments of the present invention, the bacteria are formulated as a pellet.

According to embodiments of the present invention, the pellet is agglomerated, granulated, pressed or extruded type.

According to embodiments of the present invention, the fish is a marine fish.

According to embodiments of the present invention, the fish is of a Tilapia species.

According to embodiments of the present invention, the fish is a carnivore fish.

According to embodiments of the present invention, the fish is selected from the group of fish listed in Table 1.

According to embodiments of the present invention, the fish is in at least a juvenile developmental stage.

According to embodiments of the present invention, the fish are in a larval stage or embryonic stage.

According to embodiments of the present invention, the inoculating is effected not more than once in 24 hours.

According to embodiments of the present invention, the inoculating is effected once a week.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1A:
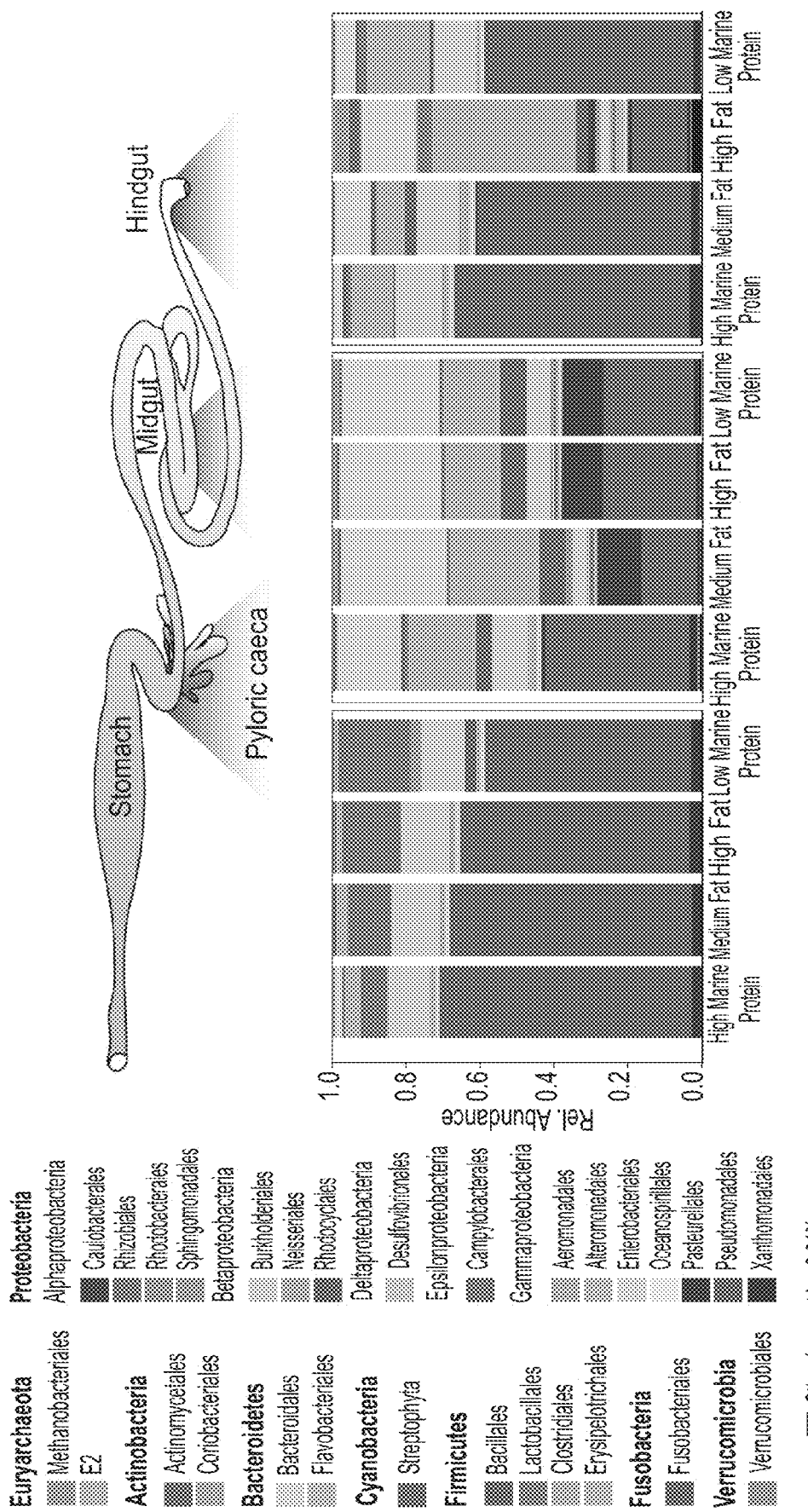

FIGS. 1A-D. Habitat filtering by gut part shapes fish gut microbial communities. A. Relative abundance of the microbial communities at the order level found in different gut compartments (pyloric caeca, midgut and hindgut) of fish fed with different diets. B. Microbial richness within the different gut compartments of fish fed different diets. Stars indicate significant difference from the pyloric caeca (Wilcoxon paired t-test, two-sided, 95% CI; ** $P<0.01$). C. Shared and unique OTUs between the different gut compartments. D. Hierarchical clustering dendrogram with jackknife support (numbers on the branches) using unweighted UniFrac as a metric to compare similarity between different gut compartments. Shapes indicate different diets and colors indicate the different fish gut parts. In data shown as box plots, a horizontal line in the box represents the median and whiskers indicate the lowest and highest points within 1.5 interquartile ranges of the lower or upper quartile, respectively.

FIGS. 2A-D core microbial community composed of 8 abundant generalist species persists across different habitats of diets and gut parts, and across different fish species. A. Niche width of the overall microbial communities calculated using Shannon index H'. Generalists are defined as microbes with the largest niche width (>6), and specialists as microbes with the smallest niche width (<1). B. Venn diagram showing shared and unique species between dietary treatments and gut parts (habitats), present in >80% of the samples for each specific habitat. The species (8 out of 11) that were shared among all diets and gut parts and fell into the generalist niche width were defined as core microbes. C. Rank-relative abundance plot of the overall microbial communities on a log scale. The red circles indicate the core species. D. Balloon plot showing the abundance of the core generalist communities across different fish species at the genus level. Red font depicts carnivorous fish, green—herbivores and yellow—omnivores.

FIGS. 3A-E. Resource partitioning potentially drives coexistence of generalist core microbes. A. Relative abundance of the core microbes in all habitats (diets and gut parts), showing a variable but defined interquartile range for each microbe, suggesting a specific niche. B. Network of co-occurring species (OTUs) based on correlation analysis. Core species have strong positive correlations among them. A connection stands for a strong (1000 most extreme values—negative or positive—based on five methods for ensemble reference: Spearman, Pearson, Mutual Information, Bray-Curtis and Kullback-Leibler dissimilarity; default settings) and significant (q-value<0.05, after Benjamini-Hochberg correction; bootstrap, N=100; permutations, n=100) correlation. The size of each node is proportional to the OTU's relative abundance. The edge thickness corresponds to the statistical significance (the P-value) of the correlation—the thicker the edge, the lower the P-value, while the edge transparency denotes the strength of the correlation (R). Green edges represent co-occurrence between two OTUs, red edges represent mutually excluded OTUs. Nodes are colored by phylum taxonomy. Core microbes' nodes are indicated as triangles. C. Competition matrix based on the NetCmpt analysis (0, no competition; 1, competitive interactions). The matrix is not symmetrical as the pairwise interactions between the OTUs may differentially affect each one of them. D. Pairwise co-cultivation of the core microbes in in vitro-digested feed extract for 24 h. Color intensity indicates fold-change increase (positive interaction; red) or decrease (negative interaction; blue) relative to single microbe growth. Asterisk indicates significant changes (Wilcoxon rank-sum test, two-sided, P<0.05, 95% CI). E. Experimental setup for isolation of core microbes from seabass gut and in vitro interaction experiments with either the digested feed or the different media using the cross-streak method.

FIGS. 4A-E. Core species exhibit higher strain variability and niche expansion congruent with habitat preference. A. Niche width (calculated using Shannon index H') and number of strains per species (OTU) in randomly selected microbes. Grey bar plots depict the niche width of each randomly selected OTU and red line indicates the number of strains found within each randomly selected OTU, after clustering its reads to the strain level at 100% sequence identity. B. Principal coordinates analysis (PCoA) of samples (n=36 samples per 768 group; 9 fish per diet and 3 parts per fish) based on strains (100% OTUs clustering) originating from the core microbe cluster by gut part (color) and diet (shape). C. Strain richness in each of the core microbes. Significant differences were evaluated based on paired Wilcoxon rank-sum test (two-sided, P 771<0.05, 95% CI, Benjamini-Hochberg correction). Data are shown as box plots with a horizontal line in the box that represents the median and with whiskers that indicate the lowest and highest point within 1.5 interquartile ranges of the lower or upper quartile, respectively. D. Phylogenetic distances of strains shared between fish and strains within a fish (paired Wilcoxon rank-sum test, two-sided, P=0.0079, 95% CI). Data are shown as box plots with a horizontal line in the box that represents the median and with whiskers that indicate the lowest and highest point within 1.5 interquartile ranges of the lower or upper quartile, respectively. E. Phylogenetic tree with all strains originating from the core microbes. From inside to outside, the coloured clades stand for the different core species. The outermost circle depicts the gut part in which a specific strain was most abundant.

Figure 5A:
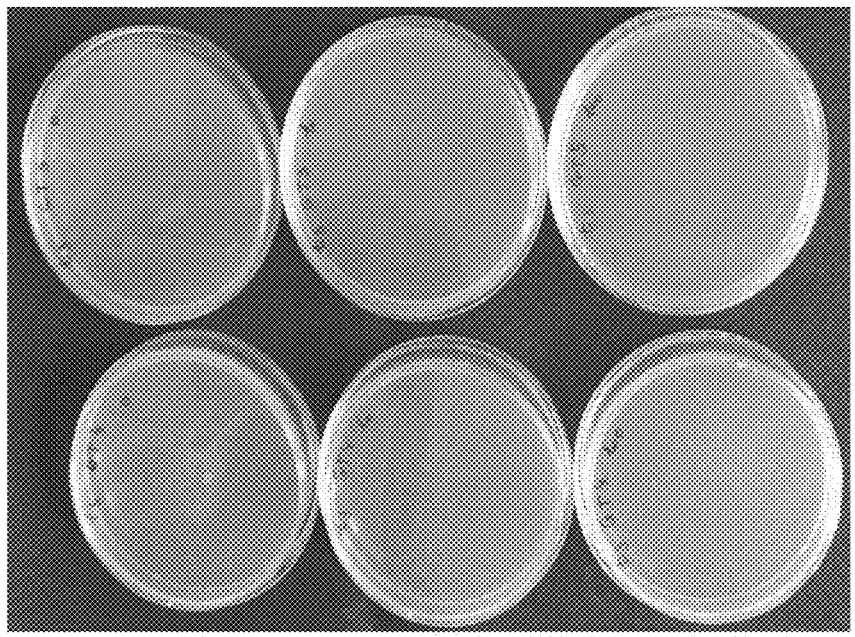
Figure 5B:
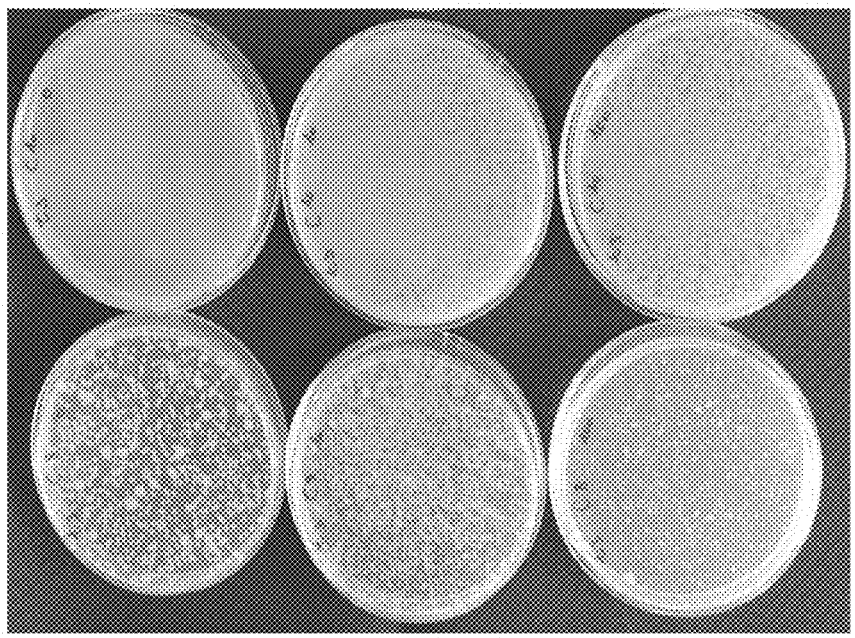

FIGS. 5A-B are photographs of agar plates following culture of sterilized (FIG. 5B) and non-sterilized (FIG. 5A) fish larvae.

FIGS. 6A-B are graphs illustrating the positive effect the bacteria of the core microbiome had on the growth and survival of the fish. Bacteria was added to the water once a week. Positive control=normal microbiome, no sterilization.

DESCRIPTION OF SPECIFIC EMBODIMENTS OF THE INVENTION

The present invention, in some embodiments thereof, relates to methods and compositions for farming animals and, more particularly, but not exclusively, to the use of probiotics for culturing fish.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Figure 2A:
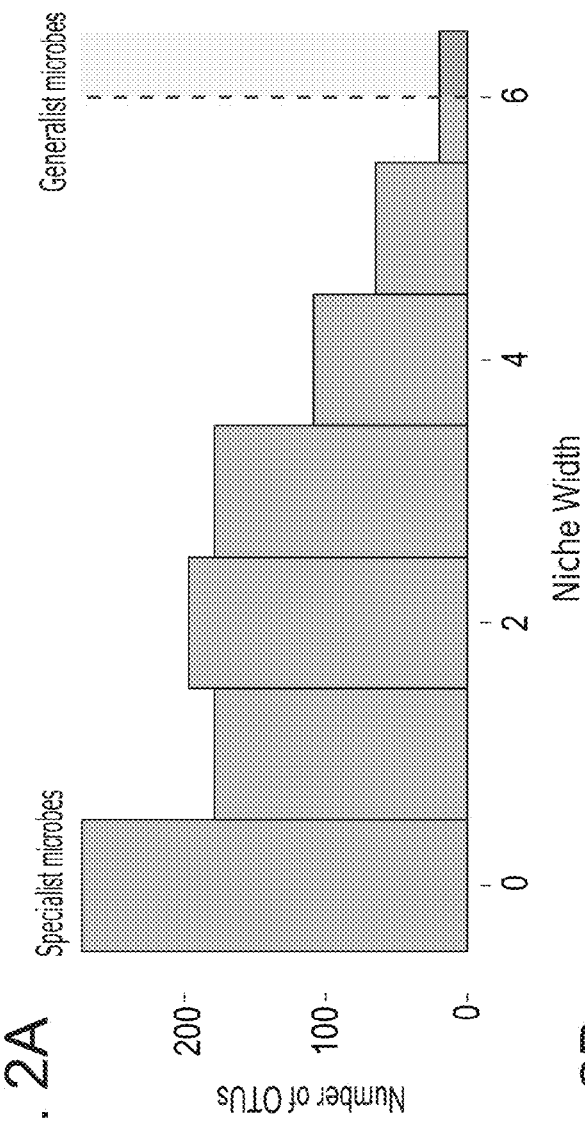
Figure 2B:
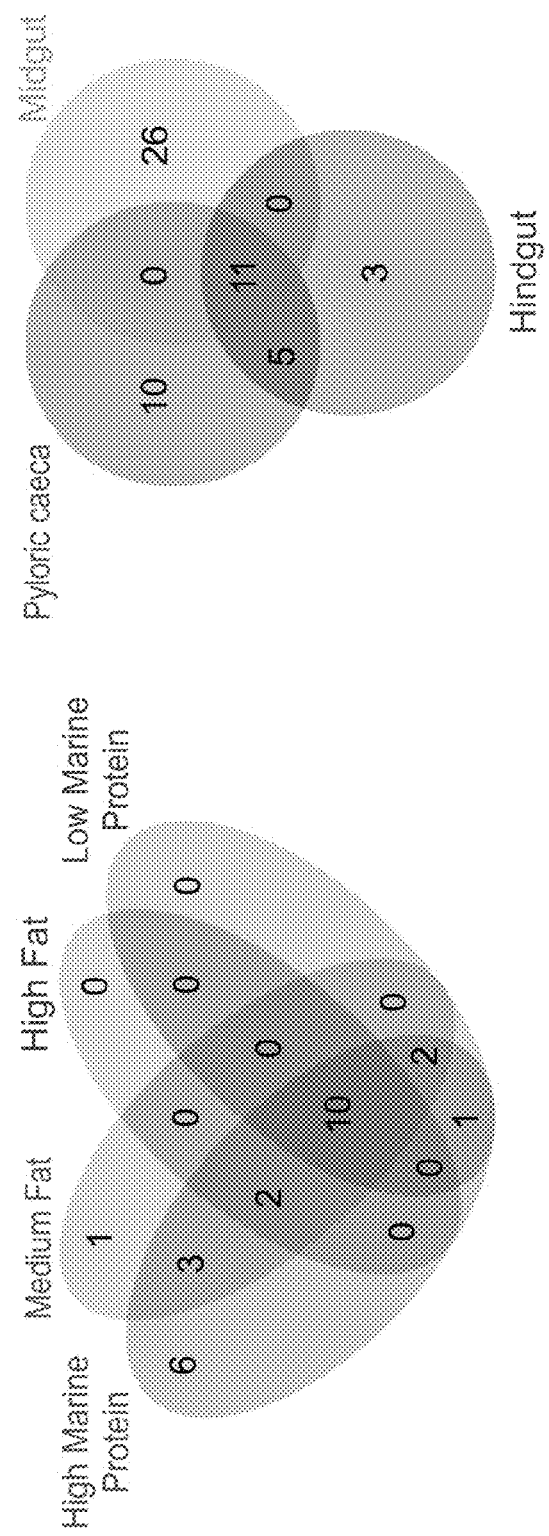
Figure 2C:
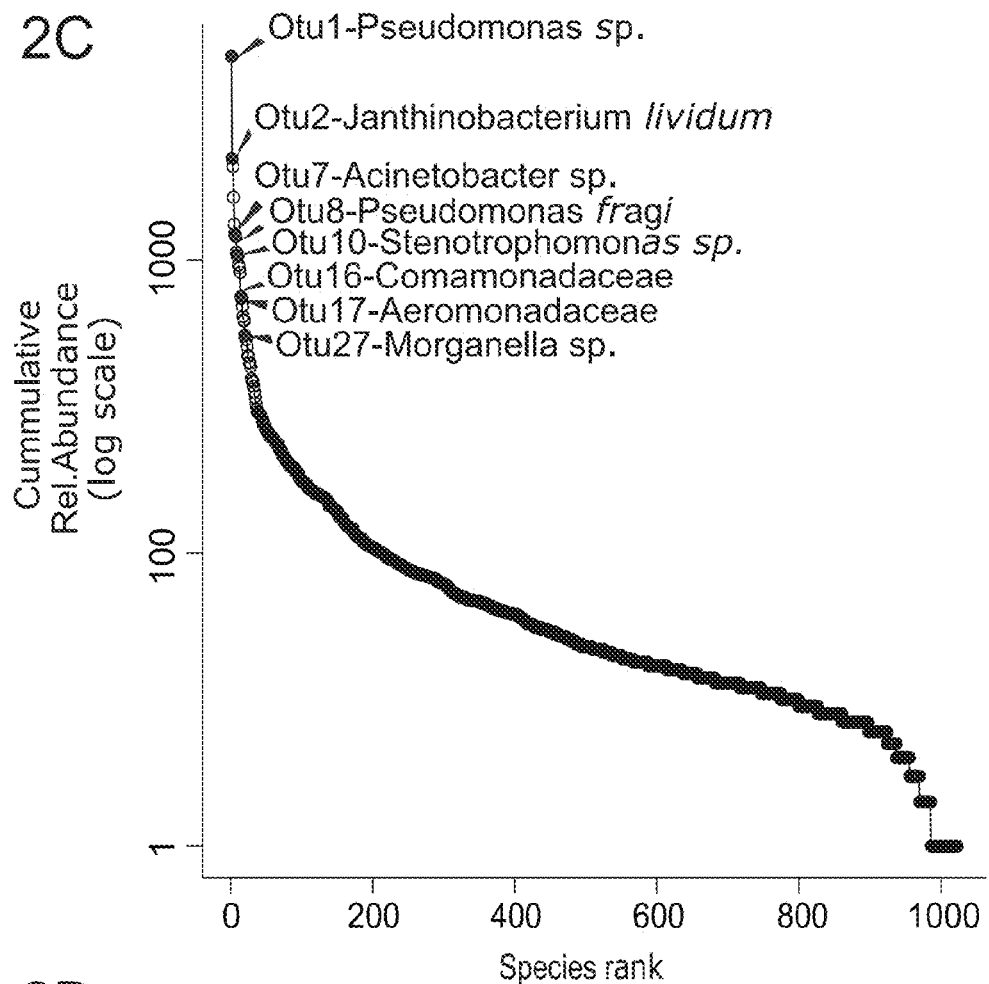
Figure 2D:
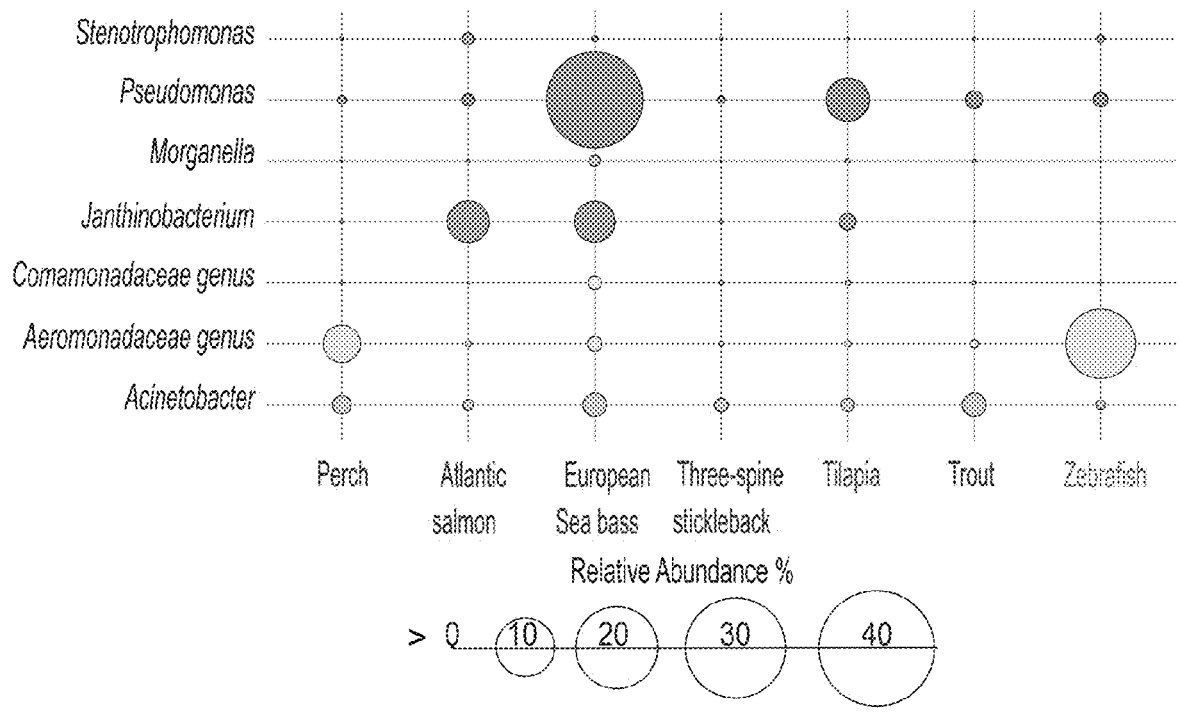

Whilst analysing the fish gut microbiome, the present inventors found core species with high abundance and occupancy across different diets and gut parts, both of which induce variable environmental conditions. These core species were found across different fish hosts that reside in different environments, such as seawater and freshwater, and that have different feeding habits, such as herbivores, carnivores and omnivores (FIG. 2D). The ubiquity of these 8 species across hosts and habitats can be explained by higher dispersal, higher adaptation and higher competitive abilities, all of which would increase their niche width along an environmental gradient. Considering the significantly large niche width, as confirmed by agreement of the three different niche width calculation methods, and co-occurrence patterns observed for these 8 bacterial generalists (FIGS. 2A and 3B), the present inventors deduced that these organisms should be strong competitors and dispersers.

Whilst reducing the present invention to practice, the present inventors fed seabass a cocktail of the core species and showed that they not only increased the survival of the fish, but also increased their weight (as seen in FIGS. 6A-B). The present inventors thus propose that these microbes may serve as useful probiotics in the aquatic industry.

Thus, according to a first aspect of the present invention there is provided a method of culturing an aquaculture of an aquatic animal species of interest, the method comprising inoculating the aquaculture with bacteria of at least one genera selected from the group consisting of *Pseudomonas, Limnohabitans, Janthinobacterium, Stenotrophomonas, Aeromonas, Acinetobacter* and *Morganella*, wherein said bacteria are provided in an amount sufficient to increase the survival and/or weight of said aquatic animal, thereby culturing the aquaculture of the aquatic animal species.

The term "inoculating" as used herein, refers to applying or delivering to the aquaculture or the aquatic animal therein, the disclosed bacteria.

The inoculating may be carried out once a day, twice a day, once a week, twice a week, three times a week, four times a week, five times a week or six times a week.

Exemplary species of the disclosed genera include *Pseudomonas veronii, Pseudomonas fragi, Limnohabitans planktonicus* (e.g. DSMZ reference number 21594), *Janthinobacterium lividum* (e.g. DSMZ reference no. 1522), *Stenotrophomonas maltophilia* and *Aeromonas hydrophila*.

According to a particular embodiment, at least one, two, three, four or five of the following genera are used in the inoculation: *Pseudomonas, Limnohabitans, Janthinobacterium, Stenotrophomonas, Acinetobacter* and *Morganella*.

Exemplary 16S rRNA sequence of the disclosed genera are provided herein below:

*Janthinobacterium lividum* (SEQ ID NO: 1);
*Aeromonas hydrophila* (SEQ ID NO: 2);
*Stenotrophomonas maltophilia* (SEQ ID NO: 3);
*Pseudomonas veronii* (SEQ ID NO: 4);
*Pseudomonas fragi* (SEQ ID NO: 5);
*Morganella morganii* (SEQ ID NO: 6);
*Limnohabitans planktonicus* (SEQ ID NO: 7);
*Acinetobacter* (SEQ ID NO: 8).

The bacterial species may have a 16S rRNA sequence at least 80% identical, 85%, identical 90% identical, 91% identical, 92% identical, 93% identical, 94% identical, 95% identical, 96% identical, 97% identical, 98% identical, 99% identical to the above disclosed 16S rRNA sequence.

The present inventors contemplate inoculation with 1, 2, 3, 4, 5, 6 or 7 of the above disclosed genera/species.

In one embodiment, between 3 and 10 genera/species of bacteria, between 3 and 9 genera/species of bacteria between 3 and 8 genera/species of bacteria, between 3 and 7 genera/species of bacteria between 4 and 10 genera/species of bacteria, between 4 and 9 genera/species of bacteria, between 4 and 8 genera/species of bacteria, between 4 and 7 genera/species of bacteria are used.

According to a particular embodiment, the aquatic animals are inoculated with *Janthinobacterium lividum* and at least one species of *Pseudomonas*—for example *Pseudomonas veronii* or *Pseudomonas fragi*.

According to a particular embodiment, the aquatic animals are inoculated with at least one species of *Pseudomonas*—for example *Pseudomonas veronii* or *Pseudomonas fragi*.

When combinations of bacterial genera or species are inoculated in the same water source, the bacteria may be formulated in a single formulation or may be individually inoculated.

As used herein "an aquaculture" or "aquaculturing" refers to cultivation of aquatic populations (e.g., freshwater, saltwater aquatic animals e.g., saltwater, brackish water) under controlled conditions. Aquatic animals grown in an aquaculture may include fish and crustaceans. It will be appreciated, that although some of the description relates to fish in more details, the invention may not be limited to fish but include also crustaceans. Crustaceans are, for example, lobsters, crabs, shrimp, prawns and crayfish. Examples of cultivated fish are provided hereinbelow (Table 1).

According to a particular embodiment, the crustaceans are shrimp.

TABLE 1

List of animal species used in aquaculture

| Common name | Scientific name | Common name | Scientific name | Common name | Scientific name | Common name | Scientific name | Common name | Scientific name |
|---|---|---|---|---|---|---|---|---|---|
| Siberian sturgeon | Acipenser baeri | Paco | Piaractus mesopotamicus | Bigmouth buffalo | Ictiobus cyprinellus | Common snook | Centropomus undecimalis | Java barb | Puntius javanicus |
| Sterlet sturgeon | Acipenser ruthenus | Black bullhead | Ictalurus melas | Bocachico | Ichthyoelephas humeralis | Barramundi | Lates calcarifer | Roach | Rutilus |
| Starry sturgeon | Acipenser stellatus | Channel catfish | Ictalurus punctatus | Bocachico | Prochilodus reticulatus | Nile perch | Lates niloticus | Tench | Tinca |
| White sturgeon | Acipenser transmontanus | Bagrid catfish | Chrysichthys nigrodigitatus | Dorada | Brycon moorei | Murray cod | Maccullochella peeli | Pond loach | Misgurnus anguillicaudatus |
| Beluga | Huso | Wels catfish | Siluris glaniis | Cachama | Colossoma macropomum | Golden perch | Macquaria ambigua | Climbing perch | Anabas testudineus |
| Arapaima | Arapaima gigas | Pangas catfish | Pangasius | Cachama blanca | Piaractus brachypomus | Gilthead seabream | Sparus aurata | Snakehead | Channa argus |
| African bonytongue | Heterotis niloticus | Striped catfish | Pangasius sutchi | Striped bass | Morone saxatilis | Red drum | Sciaenops ocellatus | Turbot | Psetta maxima |
| European eel | Anguilla | Mudfish | Clarias anguillaris | European seabass | Dicentrarchus labrax | Green terror | Aequidens rivulatus | Lake trout | Salvelinus namaycush |
| Japanese eel | Anguilla japonica | Philippine catfish | Clarias batrachus | Hong Kong grouper | Epinephelus akaara | Blackbelt cichlid | Cichlasoma maculicauda | Atlantic cod | Gadus morhua |
| American eel | Anguilla rostrata | Hong Kong catfish | Clarias fuscus | Areolate grouper | Epinephelus areolatus | Jaguar guapote | Cichlasoma managuense | Pejerrey | Odontesthes bonariensis |
| Milkfish | Chanos | North African catfish | Clarias gariepinus | Greasy grouper | Epinephelus tauvina | Mexican mojarra | Cichlasoma urophthalmus | Lai | Monopterus albus |
| Freshwater bream | Abramis brama | Bighead catfish | Clarias macrocephalus | Spotted coralgrouper | Plectropomus maculatus | Pearlspot | Etroplus suratensis | Snakeskin gourami | Trichogaster pectoralis |
| Asp | Aspius | African catfish | Heterobranchus bidorsalis | Silver perch | Bidyanus | Three spotted tilapia | Oreochromis andersonii | Indonesian snakehead | Channa micropeltes |
| Catla | Catla | Sampa | Heterobranchus longifilis | Largemouth black bass | Micropterus salmoides | Blue tilapia | Oreochromis aureus | Bastard halibut | Paralichthys olivaceus |
| Goldfish | Carassius auratus | South American catfish | Rhamdia sapo | European perch | Perca fluviatilis | Longfin tilapia | Oreochromis macrochir | Goldlined spinefoot | Siganus guttatus |
| Crucian carp | Carassius | Atipa | Hoplosternum littorale | Pike-perch | Stizostedion lucioperca | Mozambique tilapia | Oreochromis mossambicus | Marbled spinefoot | Siganus rivulatus |
| Mud carp | Cirrhinus molitorella | Northern pike | Esox lucius | Bluefish | Pomatomus saltatrix | Nile tilapia | Oreochromis niloticus | Southern bluefin tuna | Thunnus maccoyii |
| Mrigal carp | Cirrhinus mrigala | Ayu sweetfish | Plecoglossus altvelis | Greater amberjack | Seriola dumerili | Tilapia | Oreochromis spilurus | Northern bluefin tuna | Thunnus thynnus |
| Grass carp | Ctenopharyngodon idellus | Vendace | Coregonus albula | Japanese amberjack | Seriola quinqueradiata | Wami tilapia | Oreochromis urolepis | Kissing gourami | Helostoma temmincki |
| Common carp | Cyprinus carpio | Whitefish | Coregonus lavaretus | Snubnose pompano | Trachinotus blochii | Blackchin tilapia | Sarotherodon melanotheron | Spotted snakehead | Channa punctatus |

TABLE 1-continued

List of animal species used in aquaculture

| Common name | Scientific name | Common name | Scientific name | Common name | Scientific name | Common name | Scientific name |
|---|---|---|---|---|---|---|---|
| Silver carp | Hypophthalmichthys molitrix | Pink salmon | Oncorhynchus gorbuscha | Florida pompano | Trachinotus carolinus | Tilapia | Tilapia guineensis | Common sole | Solea vulgaris |
| Bighead carp | Hypophthalmichthys nobilis | Chum salmon | Oncorhynchus keta | Palometa pompano | Trachinotus goodei | Redbreast tilapia | Tilapia rendalli | Lebranche mullet | Mugil liza |
| Orangefin labeo | Labeo calbasu | Coho salmon | Oncorhynchus kisutch | Japanese jack mackerel | Trachurus japonicus | Redbelly tilapia | Tilapia zillii | Pacific fat sleeper | Dormitator latifrons |
| Roho labeo | Labeo rohita | Masu salmon | Oncorhynchus masou | Mangrove red snapper | Lutjanus argentimaculatus | Golden grey mullet | Liza aurata | Marble goby | Oxyeleotris marmorata |
| Hoven's carp | Leptobarbus hoeveni | Rainbow trout | Oncorhynchus mykiss | Yellowtail snapper | Ocyurus chrysurus | Largescale mullet | Liza macrolepis | White-spotted spinefoot | Siganus canaliculatus |
| Wuchang bream | Megalobrama amblycephala | Sockeye salmon | Oncorhynchus nerka | Dark seabream | Acanthopagrus schlegeli | Gold-spot mullet | Liza parsia | Giant gourami | Osphronemus goramy |
| Black carp | Mylopharyngodon piceus | Chinook salmon | Oncorhynchus tshawytscha | White seabream | Diplodus sargus | Thinlip grey mullet | Liza ramada | Striped snakehead | Channa striata |
| Golden shiner | Notemigonus crysoleucas | Atlantic salmon | Salmo salar | Crimson seabream | Evynnis japonica | Leaping mullet | Liza saliens | | |
| Nilem carp | Osteochilus hasselti | Sea trout | Salmo trutta | Red seabream | Pagrus major | Tade mullet | Liza tade | | |
| White amur bream | Parabramis pekinensis | Arctic char | Salvelinus alpinus | Red porgy | Pagrus | Flathead grey mullet | Mugil cephalus | | |
| Thai silver barb | Puntius gonionotus | Brook trout | Salvelinus fontinalis | Goldlined seabream | Rhabdosargus sarba | White mullet | Mugil curema | | |

Source: FAO corporate document repository, List of animal species used in aquaculture According to a specific embodiment, the aquatic animal is a marine fish or crustacean.

According to a specific embodiment, the aquatic animal is a diadromous fish or crustacean.

According to a specific embodiment, the aquatic animal is a freshwater fish or crustacean.

According to a specific embodiment, the aquatic species is carnivore (e.g., carnivore fish).

According to a specific embodiment, the aquatic species is herbivore (e.g., herbivore fish).

According to a specific embodiment, the aquatic species is omnivore (e.g., omnivore fish).

According to a specific embodiment, the fish is a finfish.

The farming of fish and crustaceans is the most common form of aquaculture. It involves raising fish, for example, commercially in tanks, ponds, or ocean enclosures, cages, usually for food. Other contemplated uses and products of aqua-culturing are provided below.

According to a specific embodiment, the fish are fish of the salmonid group, for example, cherry salmon (*Oncorhynchus masou*), Chinook salmon (*Oncorhynchus tshawytscha*), chum salmon (*Oncorhynchus keta*), coho salmon (*Oncorhynchus kisutch*), pink salmon (*Oncorhynchus gorbuscha*), sockeye salmon (*Oncorhynchus nerka*) and Atlantic salmon (Salmo salar). Other fish of interest for aquaculture include, but are not limited to, various trout, as well as whitefish such as tilapia (including various species of Oreochromis, Sarotherodon, and Tilapia), grouper (subfamily Epinephelinae), sea bass, sea bream, catfish (order Siluriformes), bigeye tuna (*Thunnus obesus*), carp (family Cyprimidae) and cod (genus *Gadus*). Other fish species that may be used according to the present teachings are provided hereinbelow (Table 1).

Contemplated are both lower-value staple food fish species [e.g., freshwater fish such as carp, tilapia and catfish] and higher-value cash crop species for luxury or niche markets [e.g., mainly marine and diadromous species such as shrimp, salmon, trout, yellowtail, seabass, seabream and grouper]).

According to a specific embodiment, the fish is a White Grouper.

According to a specific embodiment, the fish is a Gilthead Seabream.

According to a specific embodiment, the aquaculture is a monoculture comprising essentially a single fish species. Since the present teachings relate to mass production, the present teachings relate to a plurality of individuals. It will be appreciated that when relating to a single fish species (monoculture), the present invention does not exclude the presence of other species in the aquaculture (bycatch).

Thus, the cultivated species in the culture are characterized, according to a specific embodiment, by a synchronized growth.

According to a specific embodiment, the fish species of interest comprises a plurality of individuals of a specific species on interest all being at about (e.g., +/_10%, 20%, 30% or 40%) the same developmental stage.

According to a specific embodiment, the fish is at a developmental stage between larvae and adult or broodstock stage.

According to a specific embodiment, the fish is in at least a juvenile developmental stage.

According to a specific embodiment, the fish is in at least a juvenile developmental stage e.g., nursing stage, juvenile stage, finerling stage, fry stage, post larvae stage, dependent on the species.

According to a specific embodiment, the fish is up to grower/growout/parr/smolt/adult developmental stage or the broodstock stage. The names and stages are different between species of fish and also crustaceans.

According to another aspect of the present invention there is provided an aquaculture inoculant identified for inoculating an aquatic animal species of interest, the inoculant comprising bacteria of at least one bacterial genera selected from the group consisting of *Pseudomonas, Limnohabitans, Janthinobacterium, Stenotrophomonas, Aeromonas, Acinetobacter* and *Morganella*, the inoculant comprising no more than 20 different bacterial genera.

The inoculant of this aspect of the present invention may comprise a single bacterial genera or species or a combination of 2, 3, 4, 5, 6, 7 of the disclosed bacterial genera/species.

In one embodiment, the inoculant (e.g. feed) comprises no more than 2, bacterial species, no more than 3 bacterial species, no more than 4 bacterial species, 5 bacterial species, no more than 6 bacterial species, no more than 7 bacterial species, no more than 8 bacterial species, no more than 10 bacterial species, no more than 12 bacterial species, no more than 15 bacterial species, no more than 20 bacterial species.

In another embodiment, the inoculant (e.g. feed) comprises no more than 2 bacterial genera, no more than 3 bacterial genera, no more than 4 bacterial genera, no more than 5 bacterial genera, no more than 6 bacterial genera, no more than 7 bacterial genera, no more than 8 bacterial genera, no more than 9 bacterial genera, no more than 10 bacterial genera.

Preferably, at least 30%, 40%, 50%, 60%, 70%, 80%, 90% of the bacteria of the inoculant are viable.

As used herein, the term "feed" or "aquafeed" relates to a manufactured or artificial diet (i.e., formulated feeds) to supplement or to replace natural feeds in the aquaculture industry. These prepared foods are most commonly formulated as flake, pellet or tablet form.

According to a specific embodiment, the feed is agglomerated, granulated or extruded.

These formulated feeds are composed of several ingredients in various proportions complementing each other to form a nutritionally complete diet for the aquacultured species or a functional feed such as a medical diet, broadstock diet or finishing diet.

Feeds are typically composed of micro and macro components. In general, all components, which are used at levels of more than 1%, are considered as macro components. Feed ingredients used at levels of less than 1% are micro components. Both macro and micro ingredients are subdivided into components with nutritional functions and technical functions. Components with technical functions improve the physical quality of the aquaculture feed composition or its appearance.

Macro components with nutritional functions provide aquatic animals with protein and energy required for growth and performance. The feed (e.g., for fish) should ideally provide the animal with: 1) fats, which serve as a source of fatty acids for energy (especially for heart and skeletal muscles); and, 2) amino acids, which serve as building blocks of proteins. Fats also assist in vitamin absorption; for example, vitamins A, D, E and K are fat-soluble or can only be digested, absorbed, and transported in conjunction with fats. Carbohydrates, are also often included in the feed compositions, although carbohydrates are not a superior energy source for fish over protein or fat. Carbohydrates are typically provided in a range of 5-50% of the composition by weight. Minerals and vitamins are also typically included as micro components as well as others.

Thus, according to a specific embodiment, the feed comprises lysine, methionine, lipids, biotin, choline, niacin, ascorbic acid, inositol, pantothenic acid, folic acid, pyridoxine, riboflavin, thiamin, vitamin A, vitamin B 12, vitamin D, vitamin E, vitamin K, calcium, phosphorus, potassium, sodium, magnesium, manganese, aluminum, iodine, cobalt, zinc, iron, selenium, or combinations of same.

Fats are typically provided via incorporation of fish meals (which contain a minor amount of fish oil) and fish oils into the feed compositions. Extracted oils that may be used in feeds include fish oils (e.g., from the oily fish menhaden, anchovy, herring, capelin and cod liver), and vegetable oil (e.g., from soybeans, rapeseeds, sunflower seeds and flax seeds). Typically, fish oil is the preferred oil, because it contains the long chain omega-3 polyunsaturated fatty acids (PUFAs), EPA and DHA; in contrast, vegetable oils do not provide a source of EPA and/or DHA. These PUFAs are needed for growth and health of most aquaculture products. A typical feed will comprise from about 5-30% or 15-30% of oil (e.g., fish, vegetable, etc.), measured as a weight percent of the aquaculture feed composition.

According to a specific embodiment, the feed comprises a minimum of 5% total lipids and/or 5-50% carbohydrates.

As used herein "protein" refers to proteins, peptides and/or amino acids (e.g., lysine, methionine, biotine).

According to a specific embodiment, the protein is a vegetative protein, derived from a plant.

According to a specific embodiment, the protein is a non-vegetative protein, e.g., animal.

According to a specific embodiment, the protein comprises a fish protein, a poultry protein or a combination of same.

According to a specific embodiment, the protein is a synthetic protein,

According to a specific embodiment, the protein is a purified protein.

According to a specific embodiment, the protein is essentially of a single type.

According to a specific embodiment, the protein is a plurality of proteins (of different types e.g., at least 2, 3, 4, 5 etc.).

For instance, often times a combination of proteins from lupin seed, corn, soy, wheat and pea is used. Other protein sources which are vegetative include cereal gains and plant proteins.

Protein found in soybeans is another embodiment. Commercial sources of soy protein are generally available in a variety of different forms that vary in their composition and protein content. In general, soy protein products contain between 30-70% protein depending on the degree of post-harvest processing of the bean meal. Commercially available sources of soy protein suitable for use according to some embodiments, include, but are not limited to include SOYCOMIL® (Product Code: 065311), which is sold by Archer Daniels Midland Company (ADM), and PisciZyme or ME-PRO™, which are sold by Prairie AquaTech (Brookings, S.Dak.). (See, e.g., U.S. Pub. No. 2013/0142905, herein incorporated by reference in its entirety).

According to a specific embodiment, the protein is a protein preparation such as a meal.

As used herein, the term "feed meal" refers to a protein-rich feed component derived from cereals, plants, animals or fish. Feed meals may be provided in comminuted and/or dried form.

According to a specific embodiment, meals may be selected from fish meal, chicken meal, soybean meal, hydrolyzed feather meal, blood meal, meat and bone meal. According to a specific embodiment, the feed meal is fish meal or chicken meal.

As used herein, "fish meal" refers to meal produced by the boiling of landed fish and other aquatic animal species (either caught or produced), separating out water and oil (e.g. by use of a press), and then drying. Normally fish meal is dried to a moisture content of less than or equal to about 10%, and then the fish meal is distributed at room temperature. Many fish species may be used as the raw material of fish meal, such as horse mackerel, true sardine, various other sardines, mackerel, herring, capelin smelt, sand eel, various types of codfish, and Antarctic krill.

Fish meal is widely used as the main source of dietary protein for most commercially farmed fish, in part because fish meal provides a balanced amount of the essential amino acids.

According to a specific embodiment, the feed includes fish meal as a component.

According to a specific embodiment, the feed includes chicken meal as a component.

According to a specific embodiment, the feed includes soy meal as a component.

According to other embodiments, the protein is derived from surimi, ground fish meat, hill, gelatin, collagen, gluten, egg albumen.

In one embodiment, the feed may comprise further components commonly used in animal feeds. For example, attractants, anti-oxidants, immunostimulants, enzymes, pigments, organic acids, prebiotics, probiotics, feeding stimulants, antibiotics, hormones and binders and combinations thereof.

In one embodiment, the feed may comprise fishmeal, fish oil, poultry meal, poultry by-product meal, feather meal, meat meal, blood meal, bone meal, rapeseed, corn gluten, linseed, poultry oil, wheat and soy and their derivatives, lupin meal, pea protein, sunflower meal, faba bean meal, canola oil, algae, micro algae, seaweed, periphyton and agricultural or animal industry by-products.

In another embodiment, the inoculant is applied to the surface of the container which houses the aquatic animal.

In another embodiment, the inoculant is applied to the filters present in the water in which the aquatic animals live.

Any suitable growth medium capable of culturing the bacteria disclosed herein may be used; however a minimal medium may be more effective. Minimal media contains the minimum nutrients possible for colony growth, generally without the presence of amino acids, and typically contains: 1) a carbon source for bacterial growth, which may be a sugar such as glucose, or a less energy-rich source like citrate; 2) various salts, which may vary amongst the specific bacterium of the composition and growing conditions; these salts generally provide essential elements such as magnesium, nitrogen, phosphorus, and sulfur to allow the bacteria to synthesize protein and nucleic acid; 3) water (Davis, Dulbecco et al. 1990).

Examples of media suitable for culturing some of the bacterial genera are summarized in Tables 2 and 3, herein below.

In another embodiment, the bacteria are resuspended with an appropriate volume of distilled water to form a composition with a bacterial concentration of approximately $1.0\times 10^7$, $1.5\times 10^7$, $1.0\times 10^8$, $1.5\times 10^8$, $1.0\times 10^9$, $1.5\times 10^9$, $1.0\times 10^{10}$, $1.5\times 10^{10}$, or $1.0\times 10^{11}$ bacteria per milliliter. In one embodiment, the water/composition mixture is applied to an object of interest, such as fish food. Application of the mixture may be accomplished by any means known in the art, such as spraying, soaking, mixing etc.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

EXAMPLES

Reference is now made to the following examples, which together with the above descriptions illustrate some embodiments of the invention in a non-limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Niche Expansion and Selective Adaption Drive Spatial Distribution of Generalist Microbial Communities in the Fish Gut Microbiome Materials and Methods Experimental Design and Sampling: European seabass (*Dicentrarchus labrax*), an agriculturally important carnivorous fish with a common gastrointestinal tract, was obtained from a commercial hatchery (Maagan Michael, Israel) and housed in 250-L experimental indoor tanks equipped with recirculating systems. Fish were randomly and evenly distributed in triplicate groups and after adaptation to experimental conditions, they were fed four experimental diets for 6 weeks: a high marine protein diet, a medium fat diet, a high fat diet and a low marine protein diet. At the end of the experiment, three fish from each tank were randomly selected and their guts were dissected using sterile instruments and separated into pyloric caeca, foregut and hindgut (FIG. 1A). After dissection, each sample was ground, frozen and stored at −80° C. for further analysis. Sampling was performed after a 1-day fasting period.

DNA extraction. Bacterial DNA was isolated from gut samples using the protocol described by Roeselers et al. ISME J 5, doi:10.1038/ismej.2011.38 (2011), with some modifications. Excised intestines were combined in 2.0 ml screw-cap tubes with 0.5 mm and 1 mm silica beads (Biospec, USA), 400 ml 50 mM Na-phosphate buffer (pH 8.0) and 200 ml lysis solution containing 5% w/v sodium dodecyl sulfate, 0.5 M Tris-HCl (pH 8.0) and 0.1 M NaCl. Samples were homogenized in a bead-beater for 5 min on high speed. The supernatant was transferred to new tubes and lysozyme (Sigma, St. Louis, MO) was added to a final concentration of 2 mg/ml, followed by incubation at 42° C. for 1 h and then 37° C. for 1 h. The solution was then sequentially extracted with TE (10 mM Tris-HCl pH 8.0, 1 mM EDTA), saturated phenol, phenol-chloroform (1:1 v/v), and chloroform-isoamylalcohol (24:1 v/v). Finally, DNA in the aqueous phase was precipitated with 0.1 volume 3 M sodium acetate (pH 5.2) and 0.7 volume isopropanol. The concentration of DNA in the solution was measured using a Nanodrop 2000 UV-Vis spectrophotometer (Thermo Scientific) and DNA was stored at −20° C. for further analysis. Only samples that resulted in a high yield of high-quality DNA were used for subsequent analyses.

Sequencing of gut microbiome. Sequencing of the PCR-amplified V4 region of 16S rRNA was performed using a MiSeq 2000 Next Generation system (Illumina). First, amplification of the V4 region was performed under the following conditions: 94° C. for 15 min, followed by 35 cycles of 94° C. for 45 s, 50° C. for 60 s and 72° C. for 90 s, and a final elongation step at 72° C. for 10 min. The PCR product (380 bp) was cleaned using a PCR clean-up kit (DNA Clean & Concentrator™, Zymo Research) and quantified for fragments containing the Illumina adaptors. Amplification involved initial denaturation at 95° C. for 15 min and then 40 cycles at 95° C. for 10 s followed by annealing at 60° C. for 20 s and extension at 72° C. for 30 s. The product was quantified using a standard curve with serial DNA concentrations (0.1-10 nM). Finally, the samples were equimolarly diluted to a concentration of 0.4 nM and prepared for sequencing according to the manufacturer's instructions. Data quality control and analyses were performed using the usearch10 and QIIME pipeline with the default settings. First, reads were assigned to their designated sample, then length-based filtering (those of <200 bp were excluded from the analysis) and read-quality filtering were performed. Due to the high variation of sequence depths between samples, they were normalized to the lowest depth by subsampling (6000 read/sample). Next, the obtained sequences were aligned to define operational taxonomic units (OTUs) for eventual taxonomy assignment. The UNOISE3 method was used for denoising (error-correcting) the Illumina amplicon reads, and the unique denoised sequences were used as a reference for creating OTU clusters at 97% similarity. More specifically, the total sub-sampled reads were clustered into OTUs at 97% sequence identity (defined as species) using the 'uclust_ref' picking method and the denoised unique sequence from UNOISE3 as a reference. The creation of new clusters that did not match the reference sequences at 97% identity was suppressed. Taxonomy was assigned using the BLAST algorithm against the 16S reference designated as 'most recent Greengenes OTUs'51 (13_8 version).

Comparison of gut communities. Richness (number of observed species) and Shannon alpha-diversity were calculated using QIIME. Cluster analyses exploring the similarities between gut community compositions of different samples were examined using phylogeny-based approaches (UniFrac). A neighbor-joining tree of all processed reads was formed using FastTree24 (Version 2.1, default settings), which was subsequently used to calculate the weighted UniFrac matrix. The resulting distance matrix was visualized with a UPGMA dendrogram in MEGA 6.0. To directly measure the robustness of individual UPGMA clusters, we performed jackknifing by repeatedly resampling a subset of 4000 reads from each sample.

Niche width. Three methods were used for the niche width analysis. The first was Shannon diversity, which reflects both the number of different habitats that each species occupies and the evenness with which they occur and is also suitable for a high number of samples. The second was the unweighted richness of habitats, and the third was Levin's niche breadth index, which defines habitat specialization as a function of uniformity of the distribution of species abundance among habitats. Within each habitat (samples originating from different diets and gut parts), we used the frequencies of microbial taxa across the seabass gut to calculate the different indices as measures of population niche width. Taxa with higher niche width values are those that use a broader range of habitats (i.e., species that are more equally distributed across samples and are found in more of them). Thus, species with higher and lower values of niche width can be considered generalists and specialists, respectively. We then calculated the niche width and found that 8 of the 11 shared microbes defined as core microbes fall within the upper tail distribution of all three indices, which we defined as generalist microbes.

Shared and unique microbiome. Analysis of shared and unique species was conducted based on the OTU table generated by QIIME. The shared species were defined as those that were present in at least 80% of the samples for either each fish gut part or each diet. The unique species were arbitrarily defined as those that were present in more than 80% of a sole fish gut part or diet sample and were not found at all in the other types of samples. The closest bacterial genomes of the core microbes, as annotated by BLAST, were downloaded from NCBI and uploaded to the RAST server (default settings), where their predicted genes were functionally annotated by the KEGG. The data were manually curated, by counting the abundance of genes involved in main nutrient (protein, carbohydrate, nitrogen and lipid) utilization pathways in the selected genomes and analyzed using co-occurrence analysis. Checkerboard score (C-score) was determined to measure the association between species pairs based on their nutrient-utilization pathways using the R package 'picante', 'bipartite' and 'MASS'. These predicted functional profiles in the form of Enzyme Categories (EC) numbers were also supplied to NetCmpt, to calculate the competitive potential between each species pair. In vitro interactions among the core microbes. To isolate the core microbes from seabass gut, different microbiological media were used (nutrient agar, LB, King B—Table 2, herein below), following serial dilutions (0 to $10^3$) of homogenized gut tissue in 0.9% saline solution. The identity of each microbe was verified by Sanger sequencing of the V3-V4 region of the 16S rDNA (Hylabs, Israel) and annotation with BLAST. The bacteria that we did not succeed in isolating were obtained from DSMZ. To explore competitive/inhibitory interactions among the core microbes, in vitro cross-streak pairwise assays were performed in different media—nutrient agar and Davis minimal media—by adding different carbon sources: glucose, cellulose, phospatidylocholine, cysteine and casein. Triplicates of bacterial strain pairs, freshly prepared and adjusted to the same optical density at 600 nm after washing in sterile phosphate buffer solution (pH 7.0), were streaked (10 µl) across different media plates and the plates were then incubated for 72 h at 28° C. The macroscopic growth was observed for potential inhibitory activity. In addition, a co-culture assay between pairs of core microbes was performed using in vitro-digested fish feed. The digested feed was prepared by adding 5 g of a commercial European seabass feed to sterile 50-ml tubes containing 0.1 N HCl and 0.2% w/v pepsin (pH around 2). The feed was digested overnight in a shaker incubator at room temperature. The next day, the tubes were centrifuged at 10,500 g for 20 min; the supernatant pH was adjusted to 7 by titrating with sodium bicarbonate and filtered to sterile using 0.22 µm pore filters. At the start of the co-culture experiment, single colonies were grown for 24 h in 3 ml nutrient agar medium. Cells were centrifuged at 6,000 g for 15 min and washed three times with 0.9% sterile saline to remove any excess medium. The cells were then adjusted to an optical density at 600 nm of 0.2 using 0.9% sterile saline and added to 96-well sterile flat-bottom plates containing 100 µl of feed extract per well. Each well contained different pairs 499 of core microbes (50 µl of each microbe) in triplicate (36 pairwise interactions, plus 9 controls—single microbes). The co-cultures were grown for 24 h at 28° C. and mixed on a shaker rotating at 250 rpm. To measure relative abundance, DNA was extracted from a 10 µl sample from each well using the Prepman Ultra Kit (Applied Biosystems, USA), following the manufacturer's instructions. Then the relative abundance of each microbe was measured by real-time qPCR, using species-specific primers. The fold-change in growth of each microbe was calculated in comparison to the single microbes' growth as the control.

TABLE 2

| Isolated species | Media | Site |
| --- | --- | --- |
| Pseudomonas veronii | LB | Pyloric caeca |
| Pseudomonas fragi | King B (Sigma) | Hindgut |
| Stenotrophomonas maltophilia | LB | Hindgut |
| Aeromonas hydrophila | Nutrient agar | Pyloric caeca |
| Acinetobacter junii | LB | Pyloric caeca |

*Limnohabitans planktonicus* and *Janthinobacterium lividum* were cultured in R2A as detailed in www(dot)dsmz(dot)de/microorganisms/medium/pdf/DSMZ_Medium830(dot)pdf.

Strain variation. The 16S rRNA gene commonly serves as a molecular marker for prokaryotic microbial community composition and structure. The analysis of microbial communities via 16S rRNA gene data generally relies on classification-based approaches that make taxonomic assignments by comparing each DNA sequence to reference databases, or clustering-based methods that group together multiple sequences as taxon-independent OTUs using a sequence-similarity threshold.

To unravel the complex relationships between bacteria and the environment, which often requires information about microbial diversity at finer scales when closely related but subtly distinct gene sequences represent separate entities in a microbial community, we quantified the number of strains within each 97% species cluster as the number of unique sequences that compose them (strains). We collected the cluster of sequences per OTU as already identified, and we performed the 'de novo' Uclust method to cluster the reads to the strain level at 100% sequence identity (defined as strains). To avoid noise due to sequencing errors, strains that were observed in less than two samples in the strains table were discarded. Richness was calculated for each sample at the strain level. Phylogenetic distances between strains were calculated using FastTree58 (Version 2.1, default settings).

Statistical analysis. Kruskal-Wallis one-way ANOVA and the pairwise comparison Wilcoxon paired t-test were used to test whether the means and standard deviations of alpha-diversity values between different diet categories were significantly different (P<0.05) and strain richness (using 'wilcox.test' R package). Wilcoxon rank sum test was used to test for shared and unique taxa within the different parts. Corrections for P-values were applied whenever stated using R 'p.adjust'. Clustering significance for the Jaccard metric was evaluated with ANOSIM and two-way PERMANOVA for the factors gut part and diet (R packages 'vegan'). Heat maps and graphs were created using R (packages 'vegan' and 'ggplot2'). The CoNet tool was used to identify and visualize significant co-occurrence patterns within the gut microbial communities.

Results

Figure 1B:
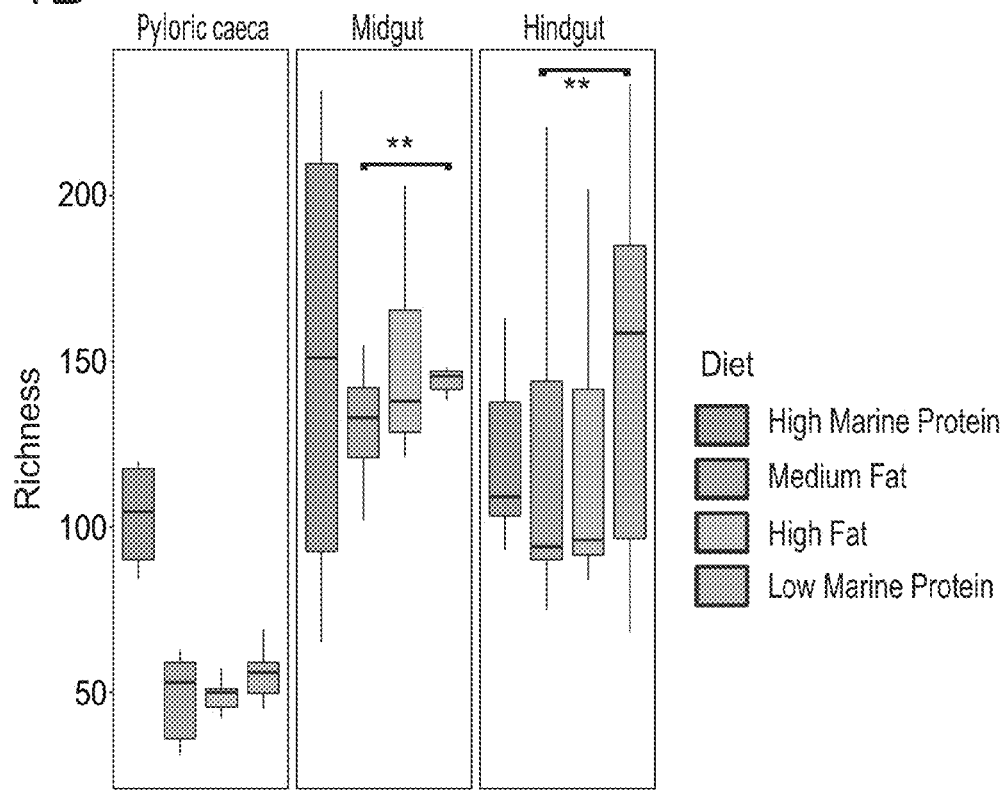
Figure 1C:
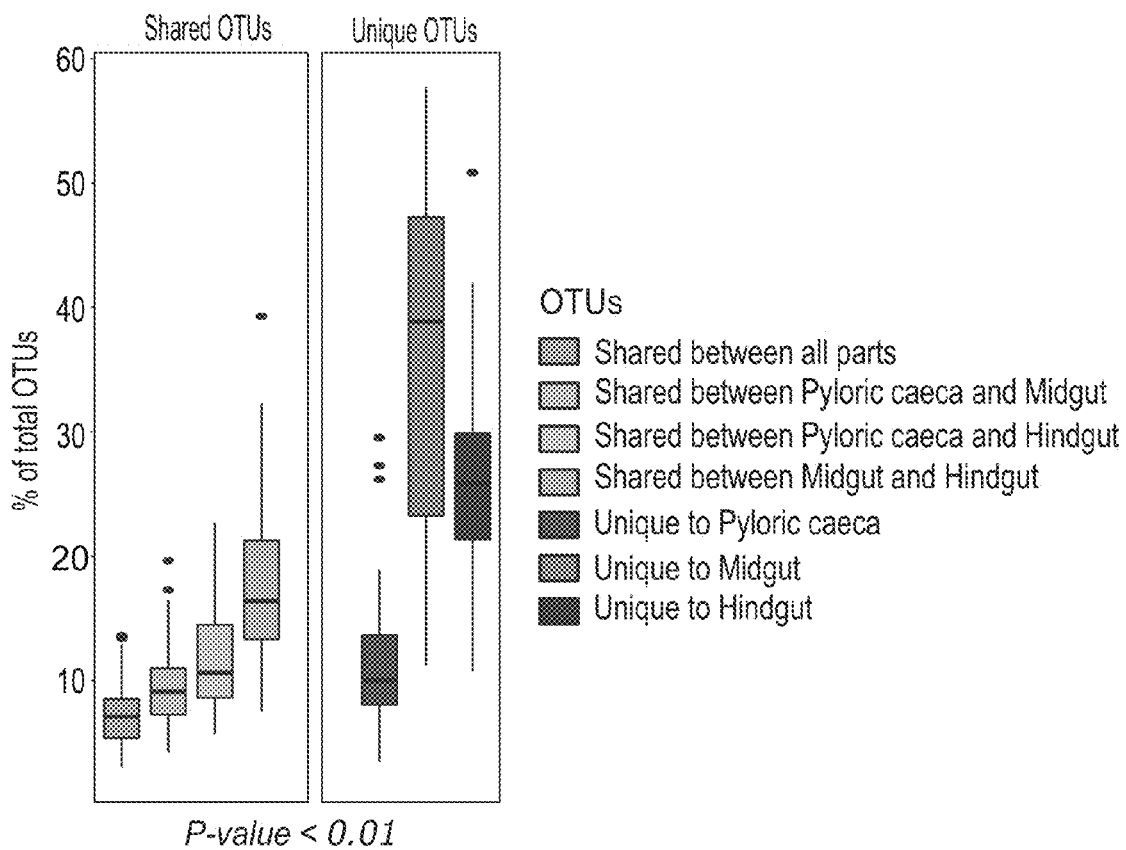
Figure 1D:
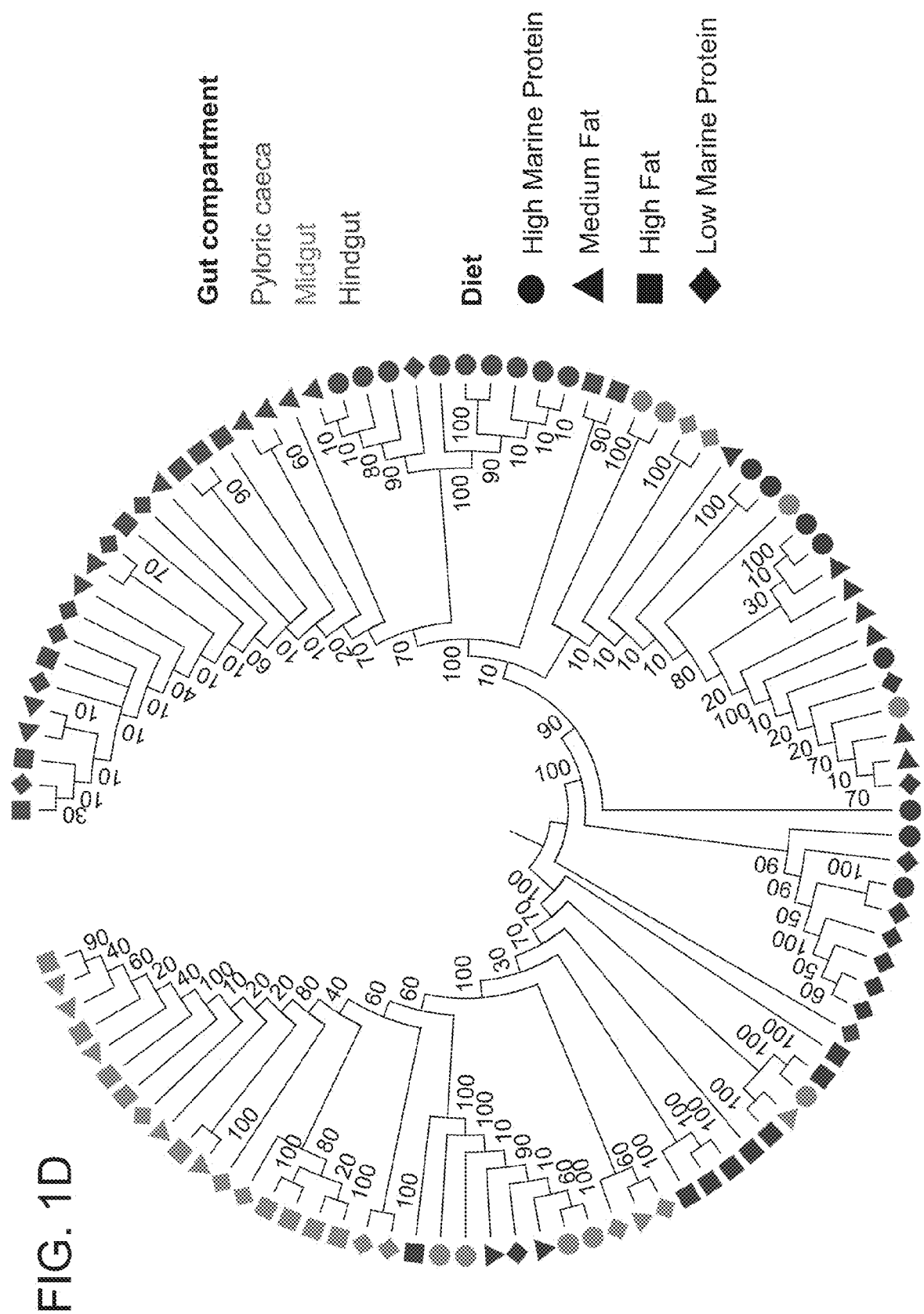

Habitat filtering by gut part, and not diet, is the major driver shaping fish gut microbial communities To test the niche variation hypothesis, habitats/environments and their microbial inhabitants were defined. The fish digestive gut microbiome members were analysed in light of two potential habitat-filtering forces: diet and gut part. Diet is known to affect microbiome composition and to act as a habitat filter. The common gut of a bony carnivorous fish is composed of three main parts: the pyloric caeca, which are finger like extensions located in the proximal part of the gut, the midgut, which is the main part of the gut, and the hindgut (FIG. 1A). As these parts are connected across the gastrointestinal tube, all microbiome members could inhabit them equally assuming only random forces were at play. However, if the parts provide different conditions, instilling habitat filtering, one would expect to see different community compositions in each of them. This premise led the present inventors to compare the two selective forces and their relative effects on microbiome composition. They sampled the three different gut parts—pyloric caeca, midgut and hindgut—of 36 European seabass fed different diets (n=9 per diet). Amplicon sequencing of the microbial communities across the fish's gut revealed significant changes in composition with gut part (PERMANOVA, Fdiet=5.6778, Fpart=7.2358, Finteraction=3.3330, permutation N=999). Interestingly, the gut part seemed to have a stronger effect on shaping microbial communities than did diet, as a more similar microbial composition within gut parts, regardless of diet (FIG. 1A) was observed. Moreover, only a small proportion of shared species between the gut parts was observed, although these parts are connected, and a high degree of shared species might be expected (FIG. 1C). Among the three gut parts, the pyloric caeca exhibited significantly lower richness (FIG. 1B; Wilcoxon paired t-test, P<0.05) and diversity. Furthermore, the pyloric caeca communities exhibited lower variability in richness between samples, unlike the high individual variation observed within each dietary group in the other two gut parts (FIG. 1B). This suggests that conditions within the pyloric caeca are more selective and potentially constrain microbial communities, decreasing the inter-individual variation and diminishing the effect of diet. Indeed, when the data was analysed using clustering analysis of beta-diversity with the jackknife approach, a strong support for microbiome clustering by gut part was observed (FIG. 1D). Specifically, in the pyloric caeca, dominance over diet in determining microbiome composition was observed (weighted UniFrac, FIG. 1D), which was depicted by clustering of the communities coming from different diets primarily by gut part. The microbial communities within the pyloric caeca, as observed by richness and diversity, clustered closer to each other and separately from the other two gut parts (FIG. 1D), suggesting that conditions within the caeca are very selective and can withstand strong dietary interventions.

Resource partitioning potentially drives coexistence of generalist core microbes situated along the gut and across different diets After identifying the effects of different environmental conditions—diet and gut part—on the microbial communities, the niche width of individual species was characterized to classify them as generalist or specialist. Generalists were defined as species that inhabit a wide range of environments along the different samples, such as different diets and gut parts, and specialists as species that have a narrower range of occupancy across these different environments. The niche width was measured for each species using three different methods: the Shannon diversity index, observed niche number (richness) and the Levin niche. Taken together, these allowed for the assessment of niche width distribution across the microbiomes, looking at each dietary regime and gut part as a potential habitat. As expected, this analysis revealed a long-tailed distribution, where microbes with the highest niche width could be defined as generalist species as they occupy more habitats (FIG. 2A). Generalists were further defined as microbes with the highest niche width (>6 using the Shannon index) found in the longer right tail of the niche distribution calculated by all three methods, and specialists were defined as microbes with lower niche width (<1 using the Shannon index) found in the left tail of the distribution. Interestingly, the identified generalist species were composed of 8 OTUs that were abundant in most habitats (present in at least 80% of the individuals from all diets and gut parts; FIG. 2B), in contrast to most microbes that could not be found in all gut parts or diets. These 8 generalist species contributed to less than 0.8% of the overall richness. Nevertheless, they occupied more than 80% of the habitats and represented 60% of the overall abundance (FIG. 2C). Interestingly, examination of datasets from different studies, revealed that these microbes could be found in many gut systems of other fish species (FIG. 2D). The distribution of these microbes clearly varied in the present system (FIG. 3A), being affected by gut part, dietary treatment, or both, but they always remained within a defined interquartile range for each microbe, suggesting a specific niche for each of these microbes that could potentially allow them to coexist.

Figure 3A:
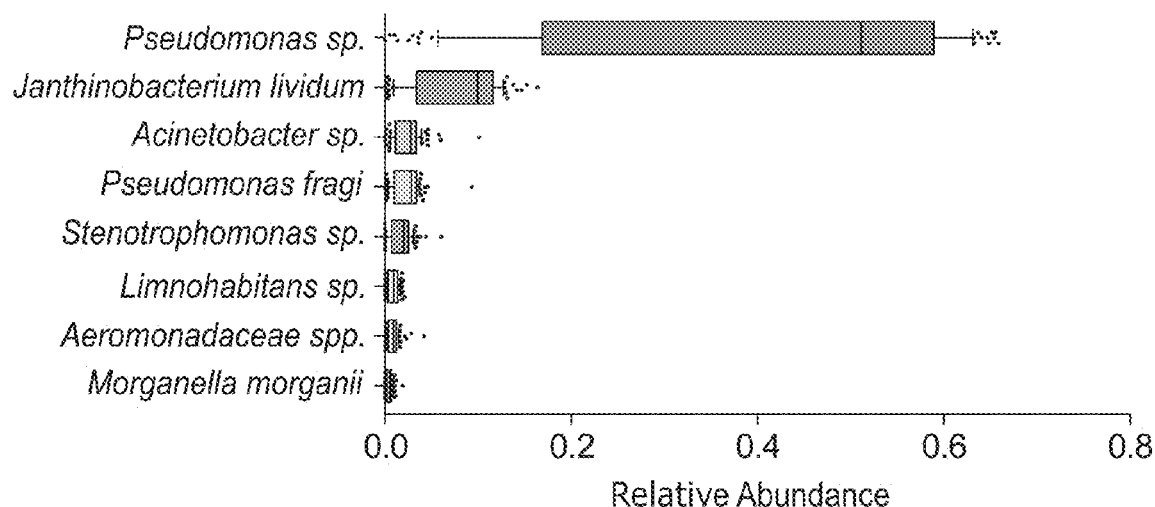
Figure 3B:
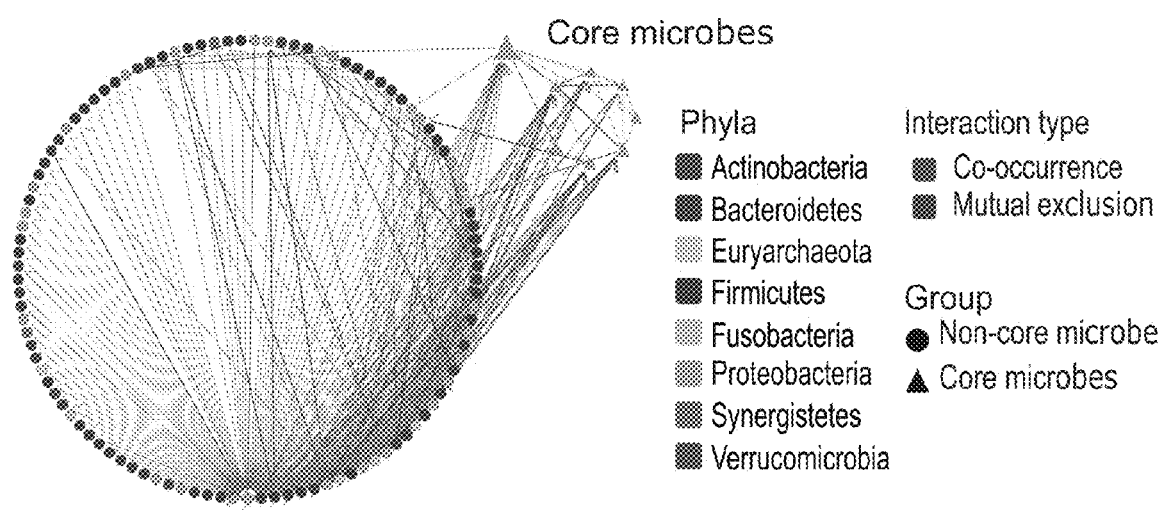
Figure 3C:
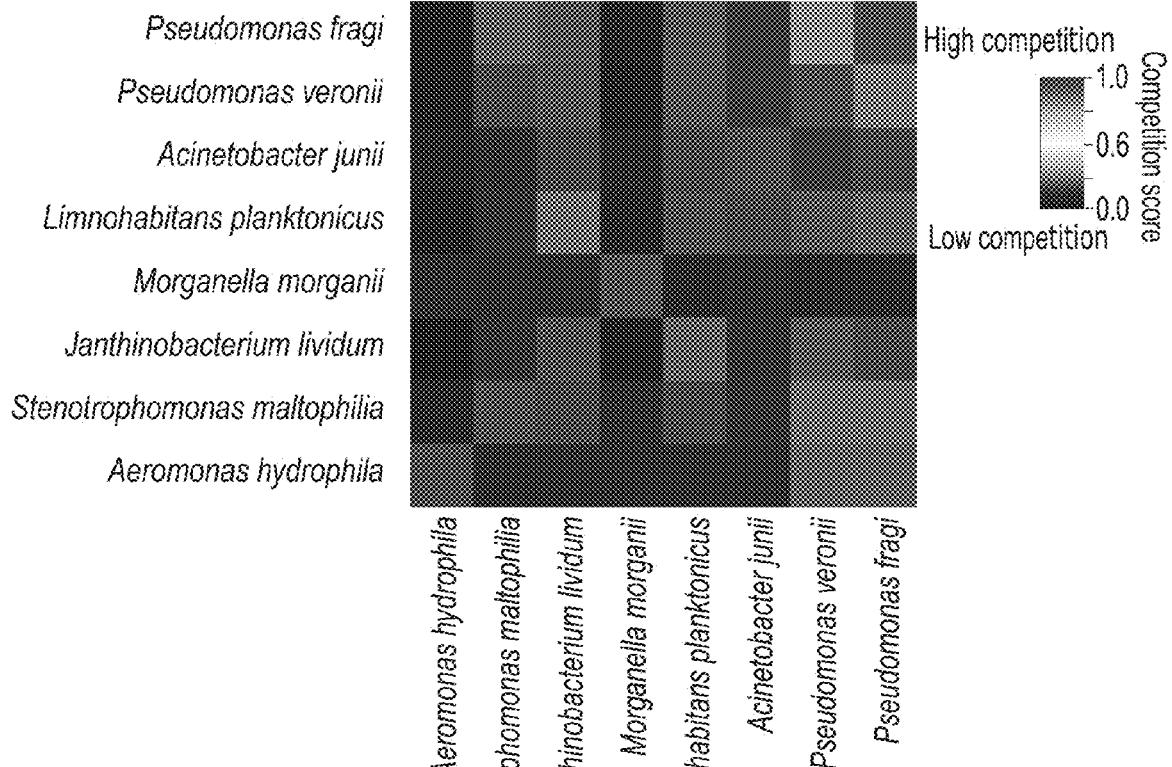

The present inventors then further examined the notion of persistence of these fish core gut microbes over time. They conducted a time-series experiment in which they sampled the three gut parts across different diets. The rationale for this experiment stemmed from the possibility that some gut microbes are transient residents of gut ecosystems. Such transient taxa, which are usually rare members of the microbiome, can occasionally bloom and therefore could be misleadingly counted as stable microbiome residents. When examining the distribution of transient microbiome residents over time, they are expected to follow a bimodal distribution, whereas stable residents show a uniform distribution. The analysis revealed that the identified core microbes are stable residents of the fish gut microbiome, as were most of the fish gut microbes in this study. Interestingly, positive correlations and co-occurrence patterns between the core microbes were uncovered (FIG. 3B), contrasting with the mutual-exclusion patterns observed with other microbiome members and suggesting that the coexistence of these microbes is driven by a non-competitive relationship. Indeed, evaluation of the metabolic competitive potential of these species by their metabolically overlapping pathways showed low levels of competition, as indicated by values close to 0 using the NetCmpt tool (FIG. 3C). These findings suggested that niche partitioning contributes to the persistence of these core microbes by enabling a low level of competition and possibly positive interactions between them.

Figure 3D:
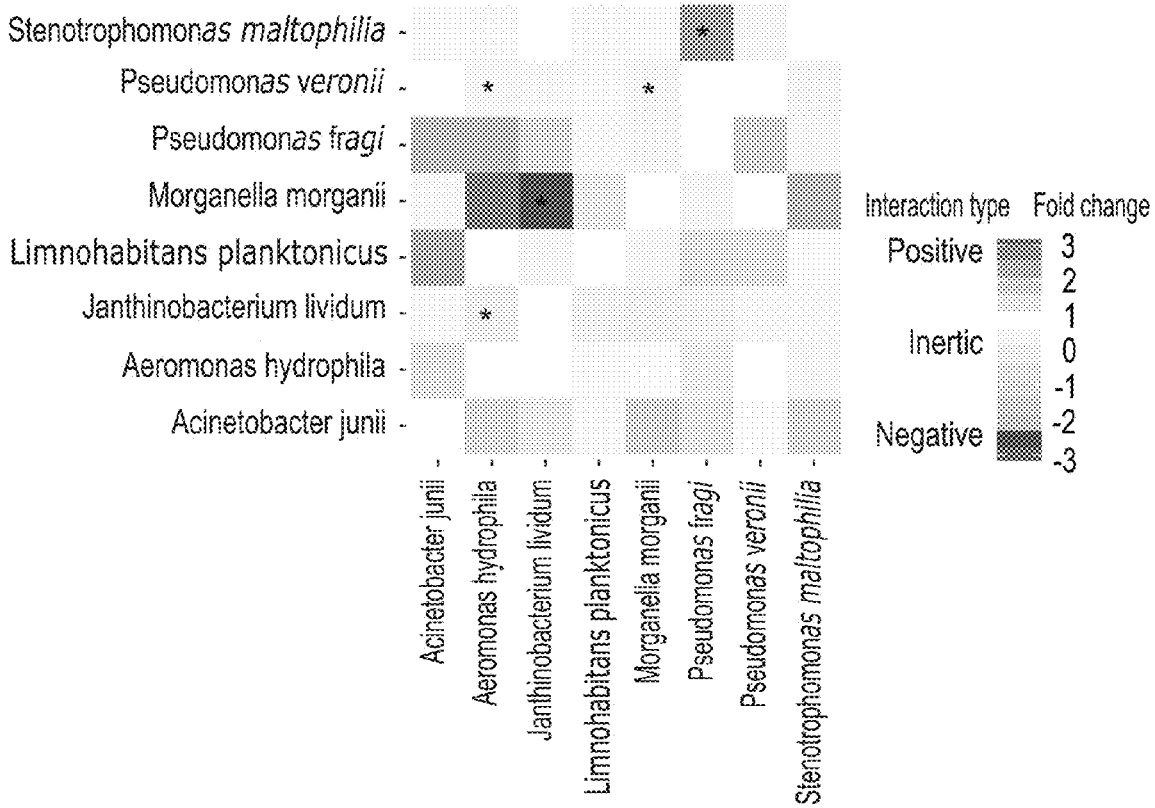
Figure 3E:
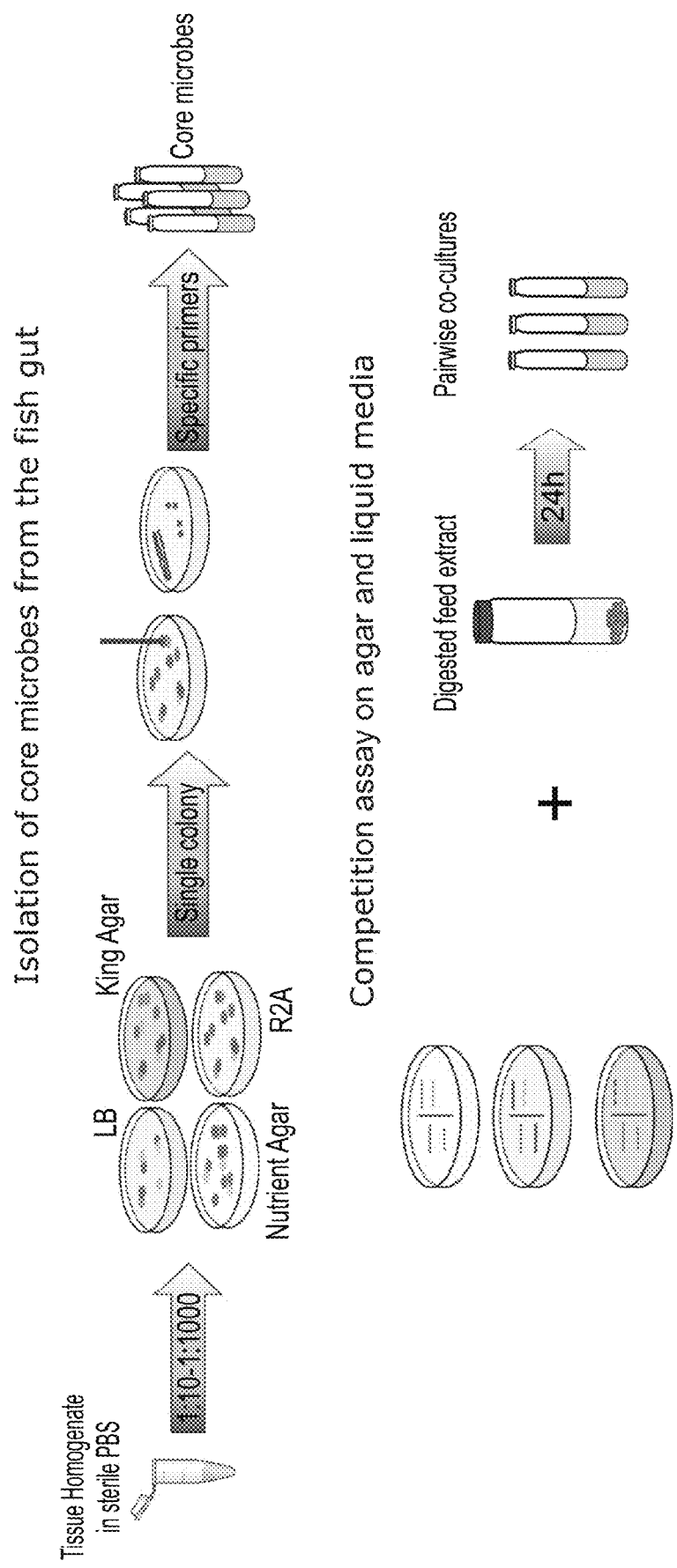

To test this hypothesis, the inventors isolated and obtained all core microbes and determined their interactions using two approaches: minimal media containing various carbon sources and media containing in vitro-digested feed to simulate gut conditions (FIG. 3E). This enabled a further understanding of their potential interactions, considering interference competition and other types of interactions that can occur between microbes but are overlooked by the co-occurrence networks and the NetCmpt tool. In these experiments, either positive or low-level competitive interactions among the core microbes was observed (in vitro-digested fish feed; FIG. 3D). Taken together, these findings agree and indicate that positive and low-level competitive interactions support stabilization and coexistence of these core microbes.

Generalist core species show higher variability and genetic expansion, congruent with their habitat selection As already noted, according to the niche variation hypothesis, a shift in balance from interspecific to intraspecific competition will result in an expansion of the population's niche. In such a scenario, generalist populations will tend to be more ecologically variable in order to reduce intraspecific competition7. In the present experimental setup, the present inventors were able to test this hypothesis as they observed selective conditions within the pyloric caeca resulting in lower richness of the microbiome, while at the same time identifying a community of generalist microbial species that exist throughout the fish's intestinal tract. According to the niche variation hypothesis, in environments with reduced richness and similarly available niches, interspecific competition is lower, as there are less species competing for the same resources; as a result, intraspecific competition is enhanced. Such is the case in the pyloric caeca that are inhabited by a lower number of species than the other gut parts and are located in the upper digestive tract; due to their proximity to the stomach, they are expected to have either the same or higher amounts of available nutritional resources compared to the lower digestive tract parts .Therefore, populations thriving here can expand their niche through increased individual variability to reduce intraspecific competition. Hence, one would not only expect higher variability within these generalist species compared to other species, but this increase in variability should be more pronounced in the pyloric caeca compared to the other gut parts, where higher species richness increases intraspecific competition. To address the hypothesis that high selectivity and low richness in the pyloric caeca allow higher intraspecific variability, the intraspecies variation of these species clusters was examined in each of the gut parts and the core microbes' variability was compared to that of other members of the microbiome. To this end, these generalist species clusters (species-OTU clusters of 97% similarity) were unwound and analyzed under strain-level resolution (all unique sequences that were originally clustered to a given species-OTU). The variability within each species-OTU cluster was then measured. Compared to the non-257 generalist species, these generalist species were found to have higher strain variability (FIG. 4A; Mann-Whitney,Monte-Carlo permutation, N=999, P=0.0001, 95% Confidence Interval, CI).

Figure 4A:
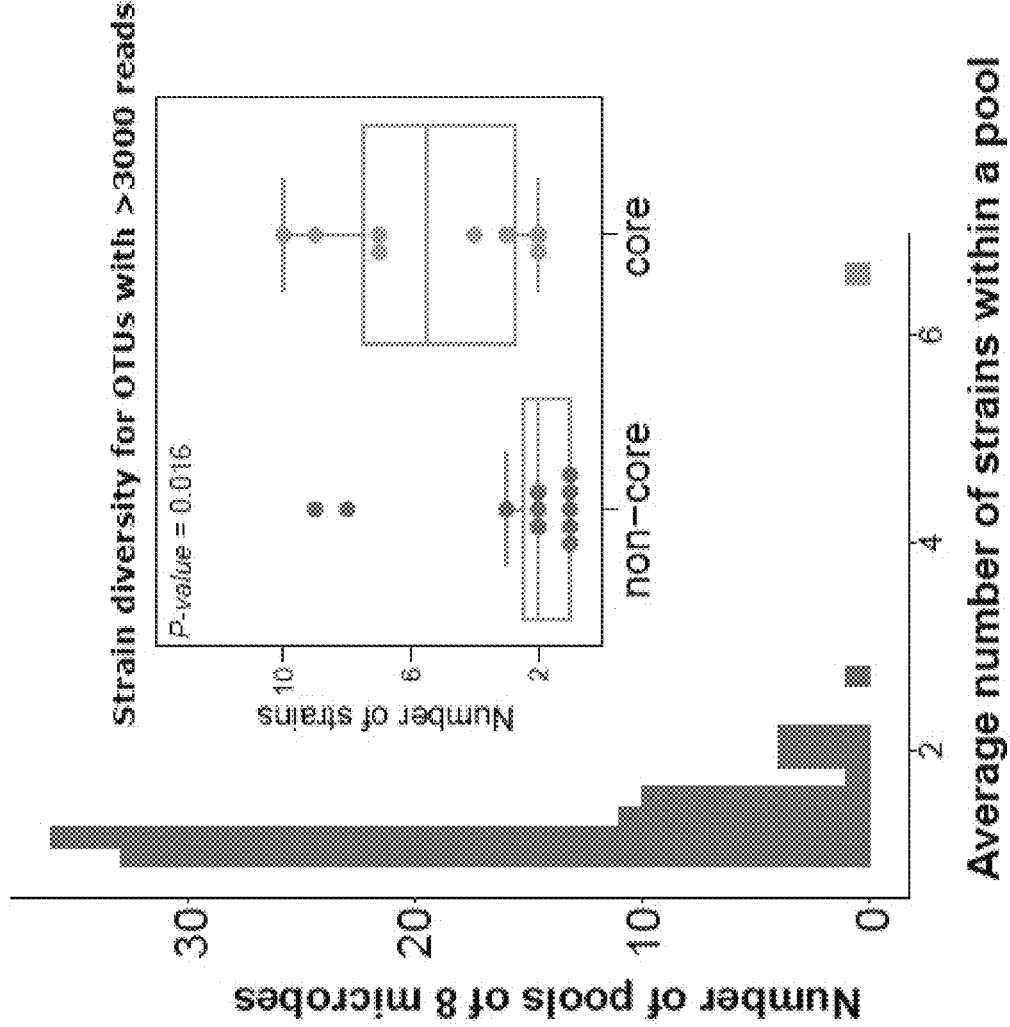
Figure 4B:
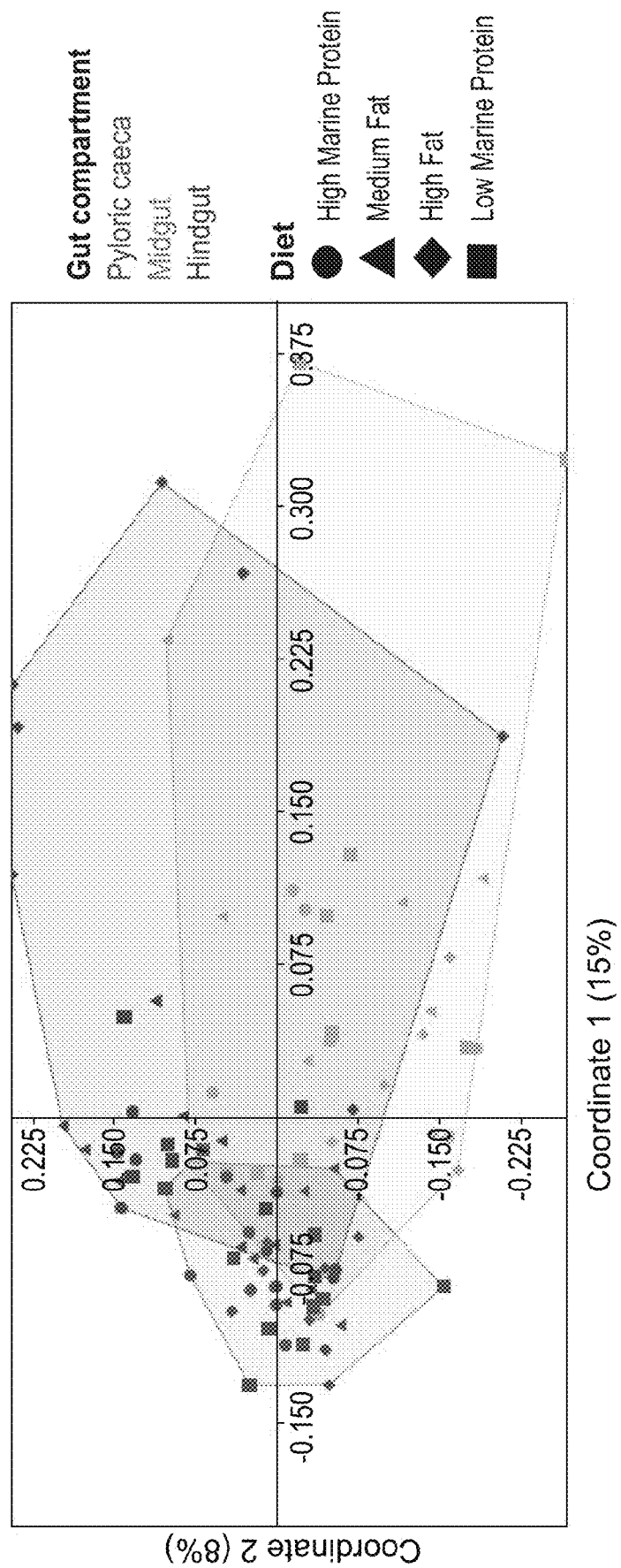
Figure 4C:
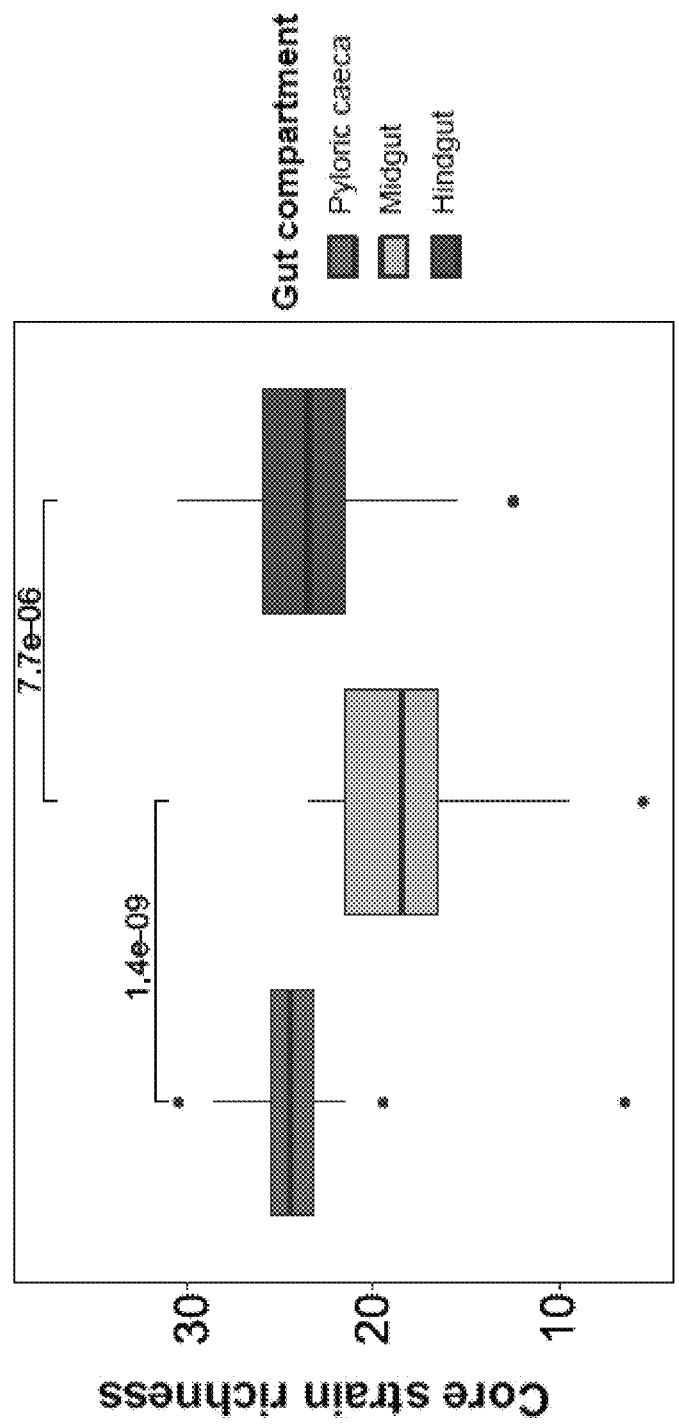
Figure 4D:
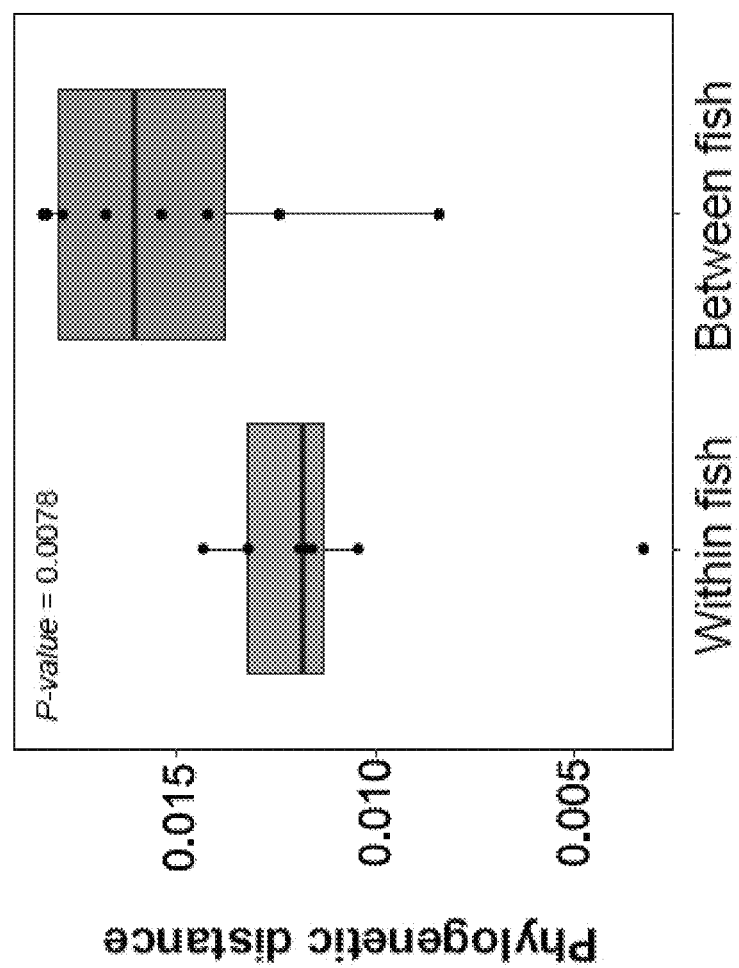

Moreover, as expected, a higher richness of strains within the generalist species in the pyloric caeca was noted compared to the other gut parts (FIG. 4C; Wilcoxon paired t-test, P<0.05). An examination of strain richness in other randomly selected OTUs distributed across the niche width did not reveal similar patterns, suggesting that this attribute could belong to the generalist taxa. The present inventors set out to further test whether generalist species are clusters of specialized individuals, as predicted by the niche expansion hypothesis. They examined whether the different strains of the generalist species show a clear tendency to inhabit one habitat over another, which would suggest adaptation of these strains to their specific habitat. They analyzed the presence-absence patterns of these strains across the different gut parts using the Jaccard similarity metric. The analysis revealed clear and significant clustering of strains of all generalist species separating the pyloric caecum strains (100% clustering) from those of the other two parts (PERMANOVA R statistic=0.10339, P=0.001, 95% CI; FIG. 4B), thus further supporting the niche variation hypothesis.

Figure 4E:
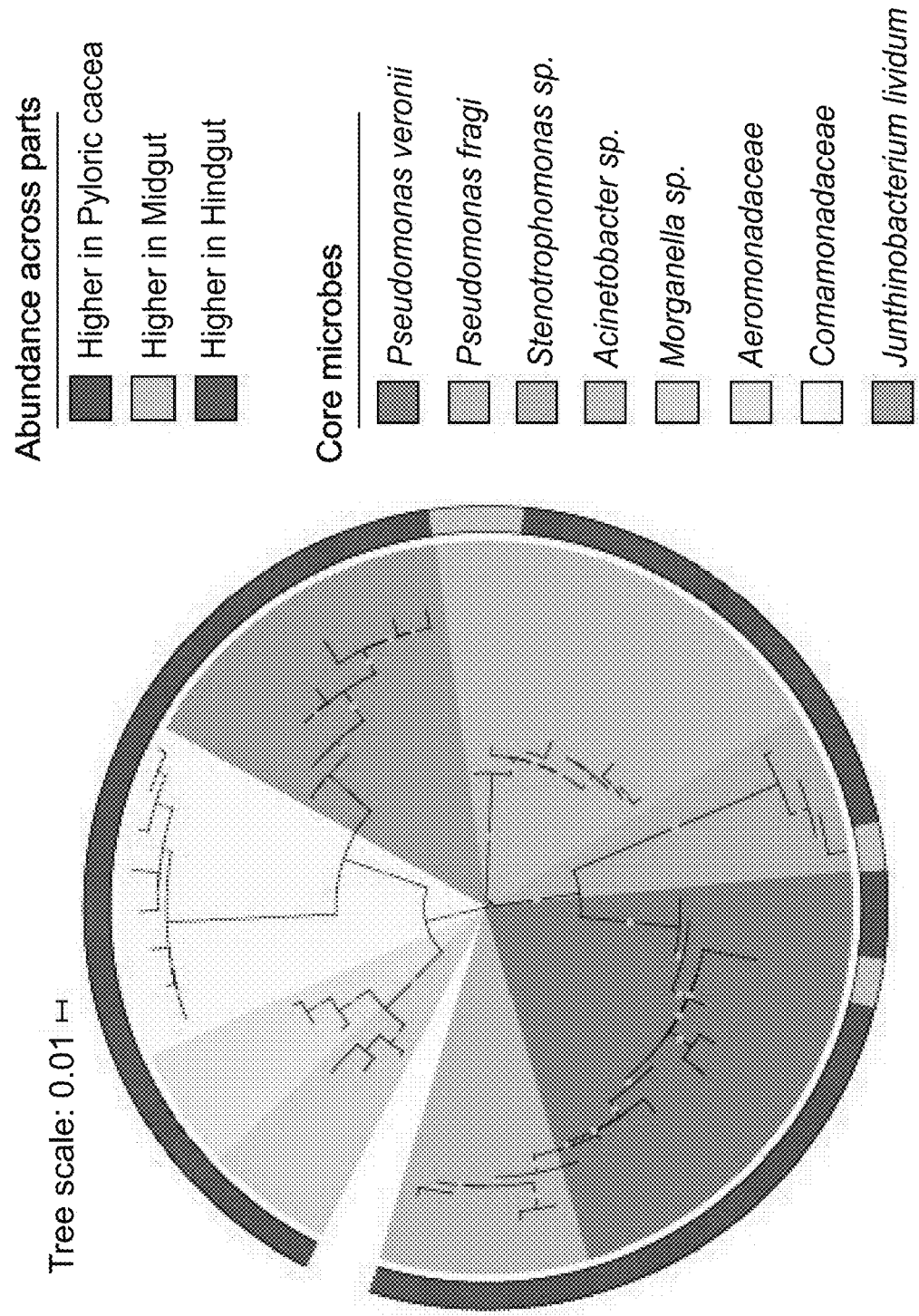

The present inventors then asked whether the habitat tendency patterns are the result of radiation of these strains from an ancestor that carries this trait, or if this trait developed in parallel in different strains, regardless of their phylogenetic similarity. They created a phylogenetic tree for all of the generalist species strain clusters. The results did not show agreement between habitat tendency and phylogeny (FIG. 4E). Moreover, they found that the strains were less similar within a fish than between fish (FIG. 4D), suggesting that this preference is an outcome of multiple evolutionary trajectories that converged into this phenotype; nevertheless, many other factors can contribute to among-host variation, including host genotype and stochastic processes.

Example 2

Effect of Core Microbes on European Seabass Larvae

The system used to grow the sterile fish larvae consists of a 500 ml Buchner flask, sealed with a rubber cap. A glass Pasteur pipette was inserted through the cap to enable air to come in through a 0.22 μm filter. Another 0.22 μm filter was connected with a short pipe to the side glass tube, to allow air to go out. The flasks were placed on a shaker, rotating 50-70 rounds/minute, in a temperature of 26° C., to emulate the natural incubation in the mother buccal cavity.

Breeding groups of 4 females and one male were set in 250 L aquaria, and monitored daily for spawns. Eggs were removed from the mother buccal cavity two days after spawning and fertilization, placed in petri dishes, and washed with filtered autoclaved tap water (FATW). 180 eggs were not treated and served as control. Another 180 eggs were sterilized using $H_2O_2$ (2,000 mg/L) and sodium hypochloride (NaOCl, 75 mg/L). After washing with FATW, the eggs were submerged in antibiotic cocktail (50 mg/L)—Ampicillin (AppliChem A0839), Rifampicin (AppliChem A2220), Trimethoprim (Chem-Impex 01634), Kanamycin (AppliChem A1493), Gentamycin (AppliChem A1492) and antifungl (0.5 mg/L)—Amphotericin-B (AppliChem A1907), for 2 hours. Treated eggs were placed in the 15 sterile Buchner flasks and control eggs were in 15 non-sterile flasks (12 eggs in each flask).

Larvae were sampled at 0, 3, 6, 9 and 12 days after starting the experiment. 3 treatment and 3 control flasks were sampled at each time point. Larvae from each sampled flask were homogenized, used for spread on 1.5% agar plates with 25 g/L LB, and for DNA extraction. Absolute quantification of microbial DNA was done by amplification of the 16S ribosomal unit in real-time PCR.

The results of this experiment showed no bacterial growth on the agar plates with the treated larvae (as illustrated in FIG. 5B) while there was notable bacterial growth on the plates with the control (as illustrated in FIG. 5A). The PCR quantification showed stable level of bacterial load in the treated fish (~100 copies/ng) and much higher levels on days 3 and 6 (~10,000 and ~1,000 copies/ng respectively) in the control eggs. In order to check the potential transplantation of the core microbiome, another time-point experiment was conducted, but with two additional treatments: After the sterilization stage either 6 or 3 species of the core microbiome were added to the flasks with these treatments.

From a total of 624 eggs, 156 served as control and 468 were treated with $H_2O_2$, NaOCl, antibiotic cocktail and antifungal, as described for the previous experiment.

The 6 bacterial species (Table 3) were grown over night in liquid medium (3 ml in each tube). Mix of 1.5 ml from each liquid culture was centrifuged for 10 minutes in 6,000 rpm, the supernatant was discarded and the solid residue was washed with 1 ml PBS. This centrifugation and washing was repeated twice. The concentration of bacterial suspension was estimated by absorption at 600 nm, and was diluted to OD of 0.2 which is estimated as $10^7$ cell/μl. 200 μl of the suspended microbial mix (3 or 6 species) were pipetted into each Buchner flask, containing 13 sterilized eggs in 200 ml of FATW. Overall there were four treatments in this experiment—control (untreated), sterilized, sterilized with mix of 3 bacteria, sterilized with mix of 6 bacteria. Larvae were sampled at 0, 3, 10, and 16 days after starting the experiment, three flasks from each treatment at each time point. Larvae from each sampled flask were homogenized, used for spread on 1.5% agar plates with 25 g/L LB, and for DNA extraction. Absolute quantification of microbial DNA was done by amplification of the 16S ribosomal unit in real-time PCR. The concentration of each specific core microbiome species was measured using specific primers, using the pure cultures for standard curve.

In addition, larval viability and survival was monitored throughout the experiment. At the last time point, fish from each remaining flask were weighed and measured after pictured under binocular, using the NIS Elements software.

The results of this experiment showed no bacterial growth on the agar plates with the sterilized larvae while there was notable bacterial growth on the plates with the control and those with the supplemented core microbiome. The larvae that supplemented with 6 core microbiome species had the highest survival and largest size, as represented in FIGS. 5A-B.

TABLE 3

| Microbes | Core microbes (Solution Vol.) | Half Core microbes (Solution Vol.) | Isolated (media) or purchased (Batch No.) | Cultivation media for inoculation |
|---|---|---|---|---|
| Pseudomonas veronii | 300 μl | 600 μl/— | King B (Sigma) | LB |
| Pseudomonas fragi | 300 μl | —/600 μl | King B (Sigma) | LB |
| Limnohabitans planktonicus | 300 μl | — | DSMZ 21594 | R2A |
| Janthinobacterium lividum | 300 μl | 600 μl | DSMZ 1522 | R2A |

TABLE 3-continued

| Microbes | Core microbes (Solution Vol.) | Half Core microbes (Solution Vol.) | Isolated (media) or purchased (Batch No.) | Cultivation media for inoculation |
|---|---|---|---|---|
| *Stenotrophomonas* sp. | 300 µl | — | LB (Merck) | LB |
| *Aeromonas hydrophila* | 300 µl | 600 µl | LB (Merck) | LB |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of culturing a fish, the method comprising inoculating the aquaculture with an inoculant comprising bacteria of at least one genera selected from the group consisting of *Limnohabitans*, *Janthinobacterium*, and *Morganella*, wherein said bacteria are provided in an amount sufficient to increase the survival and/or weight of said aquatic animal, thereby culturing fish, wherein the fish is at a larval stage, an embryonic stage or at a juvenile developmental stage.

2. An aquaculture inoculant for inoculating an aquatic animal species of interest, the inoculant comprising bacteria of at least one bacterial genera selected from the group consisting of *Limnohabitans*, *Janthinobacterium*, and *Morganella*, the inoculant comprising no more than 20 different bacterial genera, wherein the inoculant further comprises bacteria of at least one genera selected from the group consisting of *Pseudomonas*, *Stenotrophomonas* and *Acinetobacter*.

3. The method of claim 1, wherein said bacteria are of a species selected from the group consisting of *Limnohabitans planktonicus* and *Janthinobacterium lividum*.

4. The aquaculture inoculant of claim 2, wherein said bacteria are of the bacterial species *Limnohabitans planktonicus* and *Janthinobacterium lividum*.

5. The method of claim 1, wherein said inoculant comprises no more than 20 different bacterial species.

6. The method of claim 1, wherein the inoculant is comprised in a feed or a filter.

7. The method of claim 6, wherein said feed further comprises a nutritional ingredient which comprises fat, carbohydrate, vitamins and/or minerals.

8. The method of claim 1, wherein said inoculant comprises no more than 20 different bacterial genera.

9. The method of claim 8, wherein said inoculant comprises no more than 10 different bacterial species.

10. The aquaculture inoculant of claim 2, wherein said bacteria are formulated as a pellet.

11. The aquaculture inoculant of claim 10, wherein said pellet is agglomerated, granulated, pressed or extruded type.

12. The method of claim 1, wherein said fish is of a Tilapia species.

13. The method of claim 1, wherein said fish are salmon, grouper, trout, tilapia, sea bass, sea bream, catfish, tuna, carp or cod.

14. The method of claim 1, wherein said inoculating is effected not more than once in 24 hours.

15. The method of claim 1, wherein said inoculating is effected once a week.

16. The method of claim 1, further comprising inoculating the aquaculture with bacteria of at least one genera selected from the group consisting of *Pseudomonas, Stenotrophomonas* and *Acinetobacter*.

17. The method of claim 16, wherein said bacteria are of a species selected from the group consisting of *Pseudomonas veronii, Pseudomonas fragi*, and *Stenotrophomonas maltophilia*.

18. The aquaculture inoculant of claim 2, wherein said bacteria are of a species selected from the group consisting of *Pseudomonas veronii, Pseudomonas fragi*, and *Stenotrophomonas maltophilia*.

\* \* \* \* \*